US012092459B2

(12) United States Patent
Thomson et al.

(10) Patent No.: US 12,092,459 B2
(45) Date of Patent: Sep. 17, 2024

(54) ARRANGEMENTS FOR ROTATIONAL APPARATUS

(71) Applicant: VERTON IP PTY LTD, Queensland (AU)

(72) Inventors: Stanley Thomson, Queensland (AU); Andrew Miller, Queensland (AU); Patrick Taylor, Queensland (AU); Gerrard Hickson, Queensland (AU); Tom Koorts, Queensland (AU)

(73) Assignee: VERTON IP PTY LTD, Queensland (AU)

( * ) Notice: Subject to any disclaimer, the term of this patent is extended or adjusted under 35 U.S.C. 154(b) by 923 days.

(21) Appl. No.: 17/043,435

(22) PCT Filed: Mar. 27, 2019

(86) PCT No.: PCT/AU2019/050273
§ 371 (c)(1),
(2) Date: Sep. 29, 2020

(87) PCT Pub. No.: WO2019/183675
PCT Pub. Date: Oct. 3, 2019

(65) Prior Publication Data
US 2021/0017001 A1    Jan. 21, 2021

(30) Foreign Application Priority Data
Mar. 28, 2018 (AU) ............................... 2018901030

(51) Int. Cl.
*G01C 19/02* (2006.01)
*B66C 13/06* (2006.01)
(Continued)

(52) U.S. Cl.
CPC .............. *G01C 19/18* (2013.01); *B66C 13/06* (2013.01); *G01C 19/08* (2013.01)

(58) Field of Classification Search
CPC ........ G01C 19/02; G01C 19/08; G01C 19/10; G01C 19/16; G01C 19/18; B66C 13/06; B64G 1/286; B62D 37/06; F16C 33/581
See application file for complete search history.

(56) References Cited

U.S. PATENT DOCUMENTS 2,856,772 A * 10/1958 Strihafka ............... G01C 19/02
73/178 R
3,267,745 A * 8/1966 Smead ................... G01C 19/38
74/5.47
(Continued)

FOREIGN PATENT DOCUMENTS

CN      105691477 A  *  6/2016
CN      114771691 A  *  7/2022
(Continued)

OTHER PUBLICATIONS

Machine translation of WO 2017/138165 A1 obtained on Aug. 14, 2023.*

(Continued)

*Primary Examiner* — Adam D Rogers
(74) *Attorney, Agent, or Firm* — Quinn IP Law

(57) ABSTRACT

A gyroscopic module comprises at least one gyroscopic rotor rotatably mounted to a support, wherein the at least one gyroscopic rotor is driven by at least one first power source and at least one gimbal frame is coupled to the support of the at least one gyroscopic rotor. The gyroscopic module comprises at least one slew bearing coupled to the at least one gimbal frame to change an orientation of the at least one gyroscopic rotor, wherein the at least one slew bearing is driven by at least one second power source mounted to the at least one gimbal frame.

19 Claims, 29 Drawing Sheets

(51) Int. Cl.
    *G01C 19/08*        (2006.01)
    *G01C 19/18*        (2006.01)

(56)            References Cited

U.S. PATENT DOCUMENTS 8,555,734  B2 *  10/2013  Elms .................... G01C 19/16
                                                          74/5.37
    10,689,047 B2 *   6/2020  Krylatov ............... G01C 19/06
    11,021,347 B2 *   6/2021  Thomson ............... G06Q 10/06
    2009/0235765 A1   9/2009  Buchele et al.
    2011/0016996 A1   1/2011  Suda et al.
    2016/0298962 A1  10/2016  Lee
    2017/0219347 A1   8/2017  Veto

FOREIGN PATENT DOCUMENTS

EP           1917181 B1 *   3/2014  ............. B62D 37/06
    GB           2129554 A  *   5/1984  ........... G01C 19/025
    KR       20130136040 A  *  12/2013
    WO       WO-2017138165 A1 * 8/2017  ............... B64G 1/28

OTHER PUBLICATIONS

International Search Report for International Patent Applications No. PCT/AU2019/050273.

\* cited by examiner

ARRANGEMENTS FOR ROTATIONAL APPARATUS

FIELD OF THE INVENTION

The present invention relates to improved arrangements for rotational apparatus. In particular, embodiments of the present invention relate to improved arrangements for gyroscopic devices and more particularly for control moment gyroscopes.

BACKGROUND TO THE INVENTION

In industries such as, but not limited to transportation and construction, loads are suspended, moved and relocated multiple times before being placed in a final position. The movement of suspended loads, for example, via cranes, can pose a risk to surrounding workers and structures. While certain aspects of movement can be controlled by the crane, rotation of a load can often be unpredictable and influenced suddenly by environmental factors, such as wind and/or the nature of the load itself. It is known to control the rotation of the load by using one or more gyroscopes. Indeed, the Applicant has devised improved load management systems and methods for the tracking and control of loads which include control moment gyroscope (CMG) modules in which the orientation of the suspended load is controlled by transferring the angular momentum within the control moment gyroscopic modules. The Applicant's improved load management systems and methods are the subject of International patent application no. PCT/AU2016/050941 which is incorporated herein by reference in its entirety.

Problems associated with the use of gyroscopes in such applications are the physical size and associated mass of the rotor of the gyroscope and its housing. The defining constraint in generating useable torque or moment output from, for example, a control moment gyroscope is the outer diameter, and to a lesser extent the width or thickness, of the gyroscopic rotor. There are many applications for control moment gyroscopes in particular where the outside dimensions of the device, such as the dimensions of the gyroscopic modules as described in PCT/AU2016/050941, will be critical to usability and market acceptance. Hence, there is a need to develop an arrangement of at least the mechanical components and preferably also the electrical components for gyroscopic modules that can be accommodated in the smallest possible space for the largest possible rotor diameter.

The reference to any prior art in this specification is not, and should not be taken as, an acknowledgement or any form of suggestion that the prior art forms part of the common general knowledge.

OBJECT OF THE INVENTION

It is a preferred object of the present invention to provide an improved arrangement for rotational apparatus, and in particular for control moment gyroscopes, that addresses or at least ameliorates one or more of the aforementioned problems of the prior art and/or provides a useful commercial alternative.

SUMMARY OF THE INVENTION

The present invention relates to improved arrangements for rotational apparatus, and in particular for control moment gyroscopes. In particular, embodiments of the present invention relate to using one or more slew bearings instead of conventional bearings to support, and change an orientation of the rotor of a gyroscope.

In one form, although not necessarily the broadest or only form, the invention resides in a gyroscopic module comprising:
at least one gyroscopic rotor rotatably mounted to a support, the at least one gyroscopic rotor driven by at least one first power source;
at least one gimbal frame coupled to the support of the at least one gyroscopic rotor; and
at least one slew bearing coupled to the at least one gimbal frame to change an orientation of the at least one gyroscopic rotor, the at least one slew bearing driven by at least one second power source mounted to the at least one gimbal frame.

In some embodiments, the gyroscopic module comprises a single gyroscopic rotor driven by a single first power source; a gimbal frame coupled to each side of the support of the single gyroscopic rotor; and a slew bearing coupled to each gimbal frame to change an orientation of the single gyroscopic rotor, each slew bearing driven by a respective second power source.

In other embodiments, the gyroscopic module comprises a single gyroscopic rotor driven by a single first power source; a gimbal frame coupled to each side of the support of the single gyroscopic rotor; and a slew bearing coupled to each gimbal frame to change an orientation of the single gyroscopic rotor, wherein one of the slew bearings is driven by a respective second power source.

In further embodiments, the gyroscopic module comprises a single gyroscopic rotor driven by a single first power source; a pair of gimbal frames coupled to one side of the support of the single gyroscopic rotor; and a single slew bearing coupled to the pair of gimbal frames to change an orientation of the single gyroscopic rotor, wherein the single slew bearing is driven by a second power source.

In yet further embodiments, the gyroscopic module comprises two gyroscopic rotors driven by a respective first power source; a pair of gimbal frames coupled to each side of the support of at least one of the two gyroscopic rotors; and a slew bearing coupled to each gimbal frame and between the two gyroscopic rotors to change an orientation of the two gyroscopic rotors, wherein the slew bearing is driven by a single second power source.

In other embodiments, the gyroscopic module comprises two gyroscopic rotors driven by a single first power source; a pair of gimbal frames coupled to each side of the support of at least one of the two gyroscopic rotors; and a slew bearing coupled to each gimbal frame and between the two gyroscopic rotors to change an orientation of the two gyroscopic rotors, wherein the slew bearing is driven by a single second power source.

Preferably, a belt, or endless loop or the like couples the two gyroscopic rotors such that a first one of the two gyroscopic rotors is driven by the single first power source and a second one of the two gyroscopic rotors is driven by the belt, or endless loop or the like.

Suitably, at least one of the gimbal frames comprises an aperture allowing the passage therethrough of the belt, or endless loop or the like coupled between the two gyroscopic rotors.

Preferably, the at least one first power source and/or the at least one second power source is in the form of an electric motor.

Suitably, each slew bearing comprises a fixed inner ring comprising a ring gear and an outer ring movable relative to the inner ring.

Preferably, the outer ring of the slew bearing is coupled to the gimbal frame.

Preferably, a pinion gear is coupled to the second power source and is in engagement with the ring gear of the inner ring such that rotation of the pinion gear causes rotational movement of the outer ring of the slew bearing relative to the inner ring to change an orientation of the at least one gyroscopic rotor.

In some embodiments, the gyroscopic rotor is eccentric in that the support of the at least one gyroscopic rotor is offset transverse to an axis of a drive shaft of the at least one first power source.

In some embodiments, the at least one first power source is a wheel or hub style motor wherein the gyroscopic rotor is an integral part of the construction of the motor.

In some embodiments, each slew bearing comprises a fixed outer ring and an inner ring movable relative to the outer ring.

In some embodiments, the ring gear is offset or brought forward towards the gyroscopic rotor and optionally stretched outwards to form an outermost part of the slew bearing.

Suitably, the at least one gyroscopic rotor rotates within a vacuum contained within a stationary, hollow vacuum cover fixed to the support.

Suitably, the vacuum cover is symmetrical and/or has a cross-sectional shape substantially conforming to the cross-sectional shape of the gyroscopic rotor. Alternatively, the vacuum cover has a different cross-sectional shape to the cross-sectional shape of the gyroscopic rotor so that at least part of the vacuum cover forms structural support for one or more of the components of the gyroscopic module.

Suitably, the gyroscopic module comprises a vacuum pump mounted to the support and a conduit coupled between the vacuum pump and an interior of the vacuum cover.

Suitably, the gyroscopic module comprises one or more seals within the hollow vacuum cover against a shaft of the first power source.

In another form, although not necessarily the broadest form, the invention resides in a method of changing an orientation of at least one gyroscopic rotor in a gyroscopic module, the gyroscopic module comprising at least one gyroscopic rotor rotatably mounted to a support; at least one first power source coupled to the at least one gyroscopic rotor; at least one gimbal frame coupled to the support of the at least one gyroscopic rotor; at least one slew bearing coupled to the at least one gimbal frame; and at least one second power source mounted to the at least one gimbal frame, the method comprising driving the at least one slew bearing with the at least one second power source to change an orientation of the at least one gyroscopic rotor.

In a further form, although not necessarily the broadest form, the invention resides in a method of changing an orientation of at least one gyroscopic rotor in a gyroscopic module, the method comprising:

rotatably mounting at least one gyroscopic rotor to a support;

coupling at least one gimbal frame to the support of the at least one gyroscopic rotor;

coupling at least one slew bearing to the at least one gimbal frame;

driving the at least one gyroscopic rotor by at least one first power source; and driving the at least one slew bearing by at least one second power source mounted to the at least one gimbal frame to change the orientation of the at least one gyroscopic rotor.

Further aspects and/or embodiments and/or features of the present invention will become apparent from the following detailed description.

BRIEF DESCRIPTION OF THE DRAWINGS

In order that the invention may be readily understood and put into practical effect, reference will now be made to preferred embodiments of the present invention with reference to the accompanying drawings, wherein like reference numbers refer to identical elements. The drawings are provided by way of example only, wherein.

Figure 1:
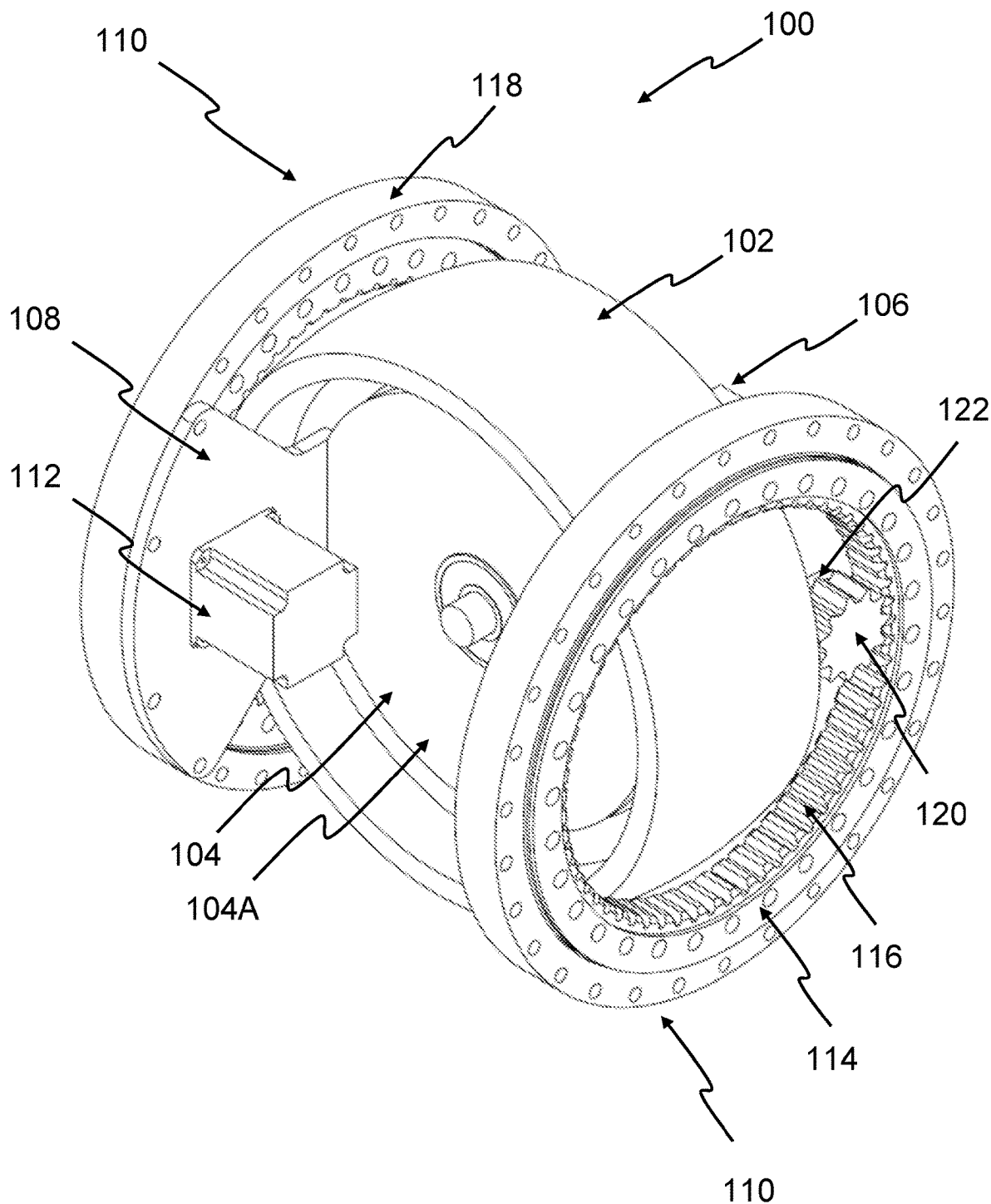
FIG. 1 is a front perspective view of a gyroscopic module according to a first embodiment of the present invention.

Skilled addressees will appreciate that elements in the drawings are illustrated for simplicity and clarity and have not necessarily been drawn to scale. For example, the relative dimensions of some of the elements in the drawings may be distorted to help improve understanding of embodiments of the present invention. Some of the elements of the apparatus may be omitted from some of the drawings to aid clarity.

DETAILED DESCRIPTION OF THE INVENTION

Embodiments of the present invention are directed to gyroscopic modules comprising at least one gyroscopic rotor rotatably mounted to a support of the at least one gyroscopic rotor. The at least one gyroscopic rotor is driven by at least one first power source. At least one gimbal frame is coupled to the support of the at least one gyroscopic rotor. At least one slew bearing is coupled to the at least one gimbal frame to change an orientation of the at least one gyroscopic rotor. The at least one slew bearing is driven by at least one second power source mounted to the at least one gimbal frame.

Figure 2:
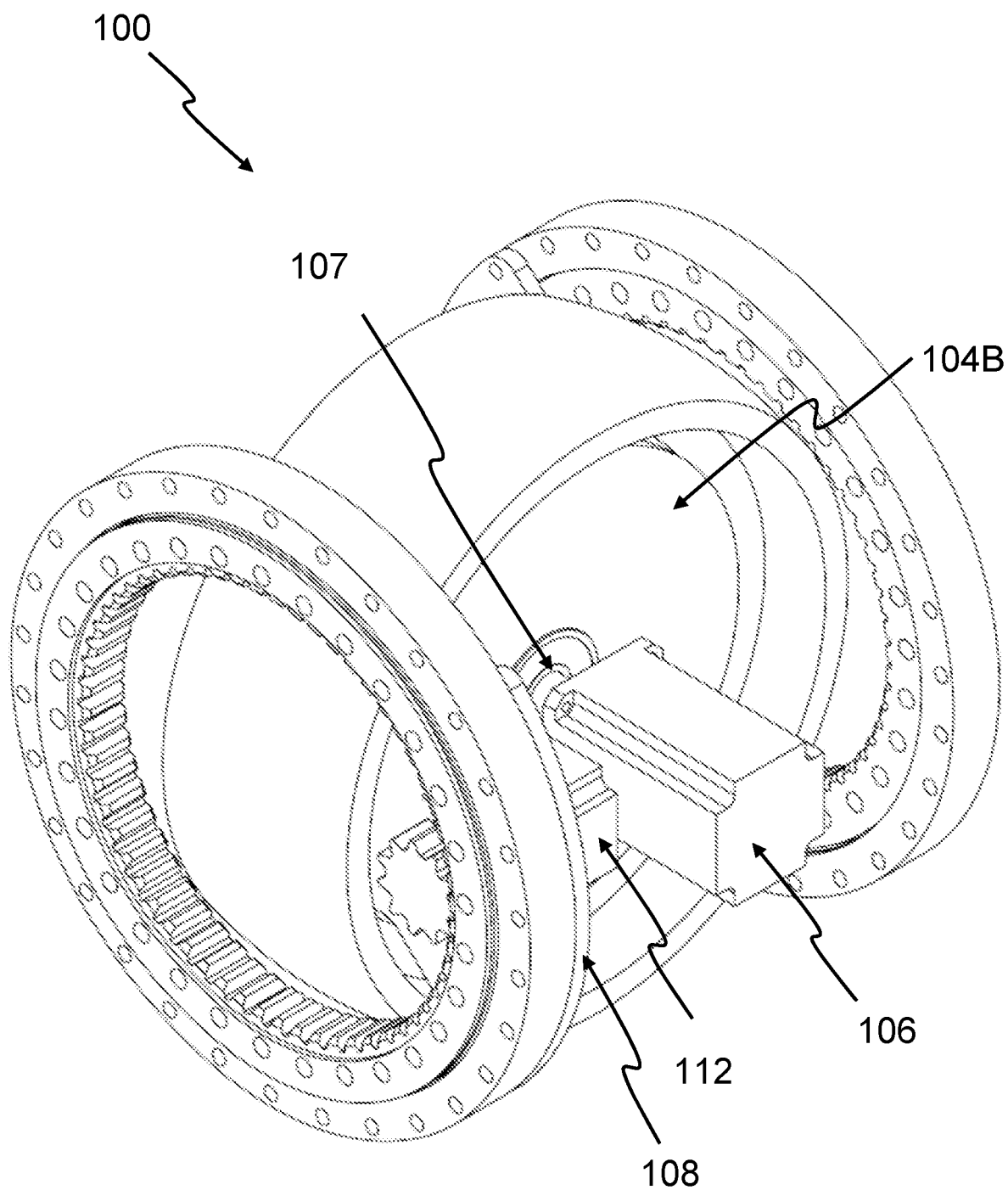
FIG. 2 is a rear perspective view of the gyroscopic module shown in FIG. 1.
Figure 3:
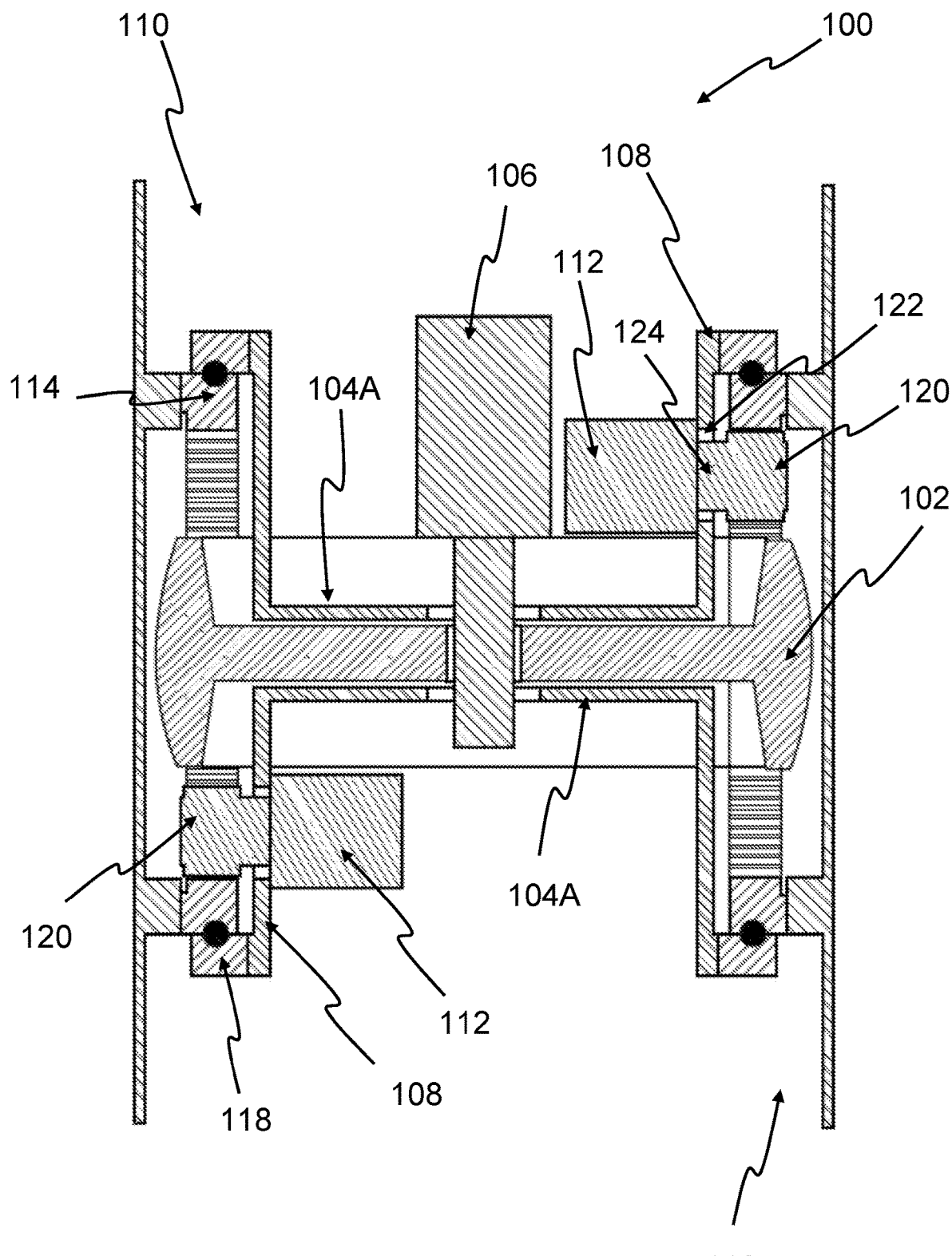
FIG. 3 is a plan sectional view of the gyroscopic module shown in FIG. 1.

With reference to FIGS. 1-3, a gyroscopic module 100 according to a first embodiment comprises a single gyroscopic rotor 102 rotatably mounted to a support 104 for the gyroscopic rotor 102. In this embodiment, the support 104 is in the form of a pair of spaced apart circular plates 104A, 104B. The gyroscopic rotor 102 is driven by a single first power source 106, such as an electric motor, coupled to the gyroscopic rotor 102 through an aperture 107 in one or both of the support plates 104A, 104B. A gimbal frame 108 is coupled to each side of the support 104 of the gyroscopic rotor 102 by any suitable means known in the art, such as welding or with fasteners, such that there are two gimbal frames 108. In this embodiment, one of the gimbal frames 108 is coupled to support plate 104A and the other of the gimbal frames 108 is coupled to the support plate 14B. Alternatively, gimbal frames 108 can be considered to be two parts of a single gimbal frame attached to the support 104 of the gyroscopic rotor 102. In this embodiment, the gyroscopic module 100 comprises a slew bearing 110 coupled to each gimbal frame 108 to change an orientation of the gyroscopic rotor 102. Hence, in this embodiment there are two slew bearings 110—one on each side of the gyroscopic rotor 102. Each slew bearing 110 is driven by a respective second power source 112, such as an electric motor, mounted to a respective one of the gimbal frames 108.

Each slew bearing 110 comprises a fixed inner ring 114 comprising a ring gear 116 and an outer ring 118 movable relative to the inner ring 114. The outer ring 118 of each of the slew bearings 110 is coupled to a respective gimbal frame 108 by any suitable means known in the art, such as welding or with fasteners. A respective pinion gear 120 is coupled to each of the second power sources 112. For example, each gimbal frame 108 can comprise a respective aperture 122 allowing the passage therethrough of a drive shaft 124 of a respective one of the second power sources 112. For each gimbal frame 108, the second power source 112 is mounted on one side of the gimbal frame 108 and the pinion gear 120 is mounted to the drive shaft 124 of the second power source 112 on the other side of the gimbal frame 108. Each pinion gear 120 is in engagement with a respective ring gear 116 of the inner ring 114 of a respective slew bearing 110. Rotation of the pinion gears 120 driven by the respective second power sources 112 causes rotational movement of the outer rings 118 of the slew bearings 110 relative to the inner rings to change an orientation of the gyroscopic rotor 102.

Figure 4:
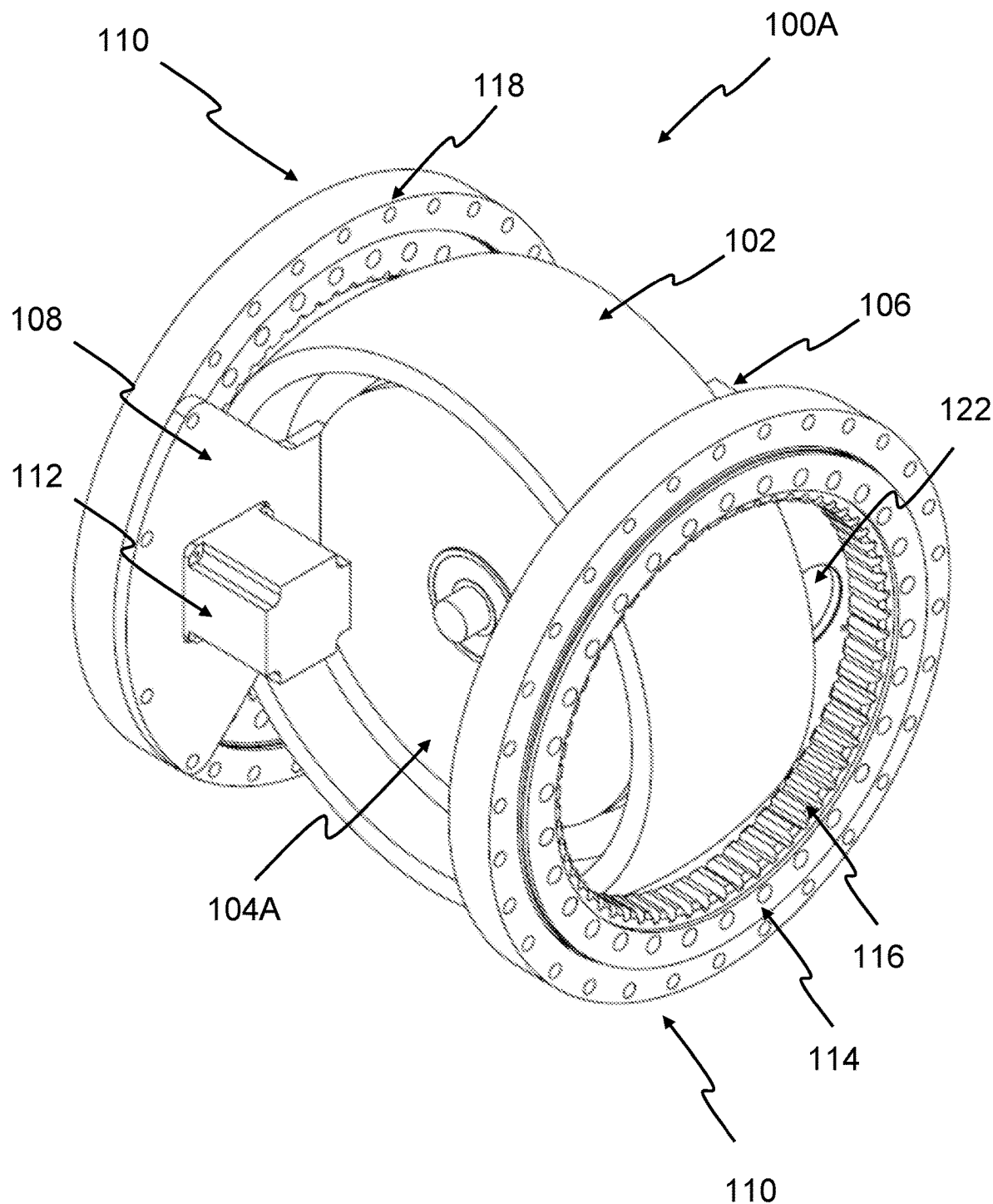
FIG. 4 is a front perspective view of a gyroscopic module according to a second embodiment of the present invention.
Figure 5:
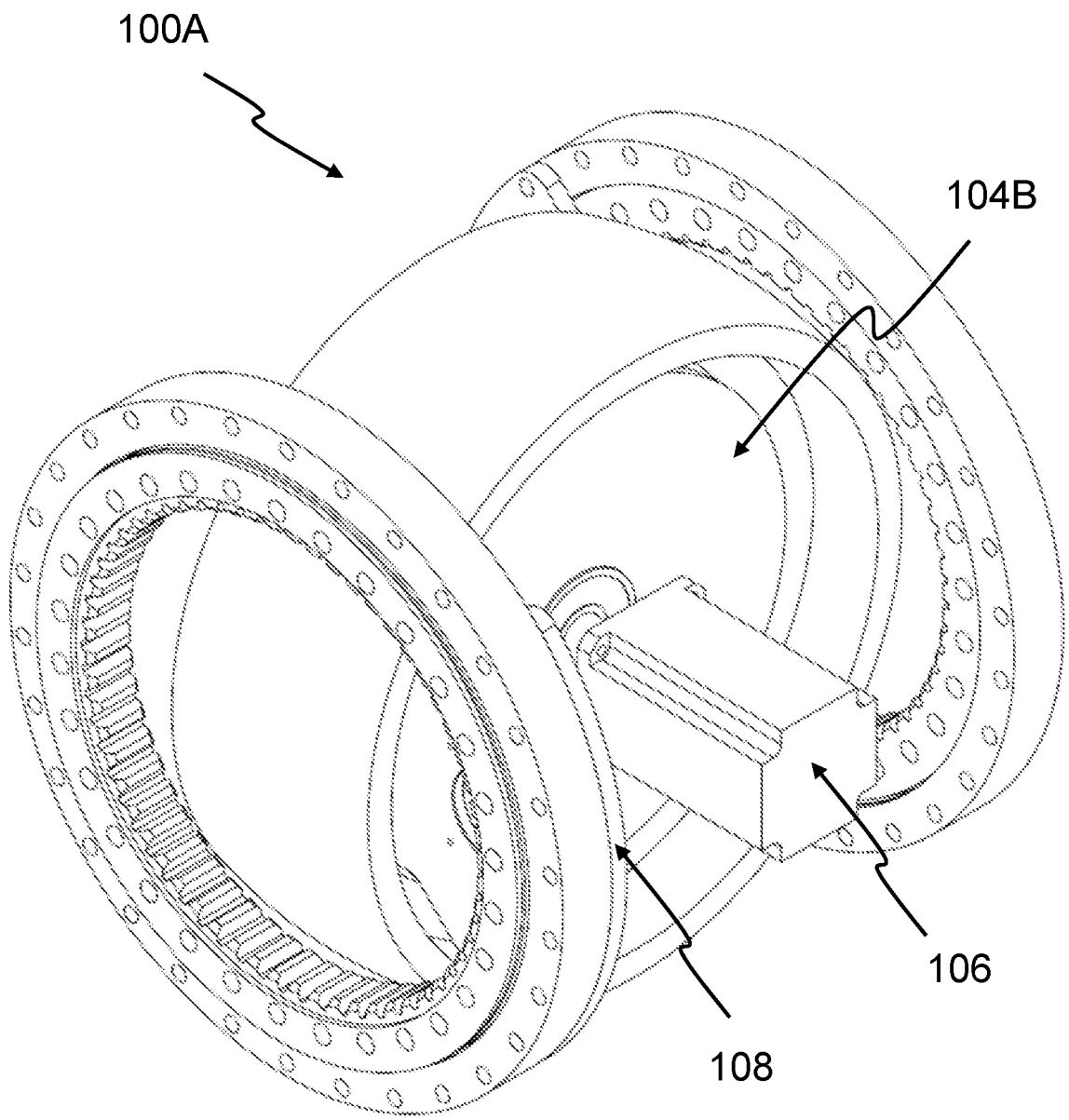
FIG. 5 is a rear perspective view of the gyroscopic module shown in FIG. 4.
Figure 6:
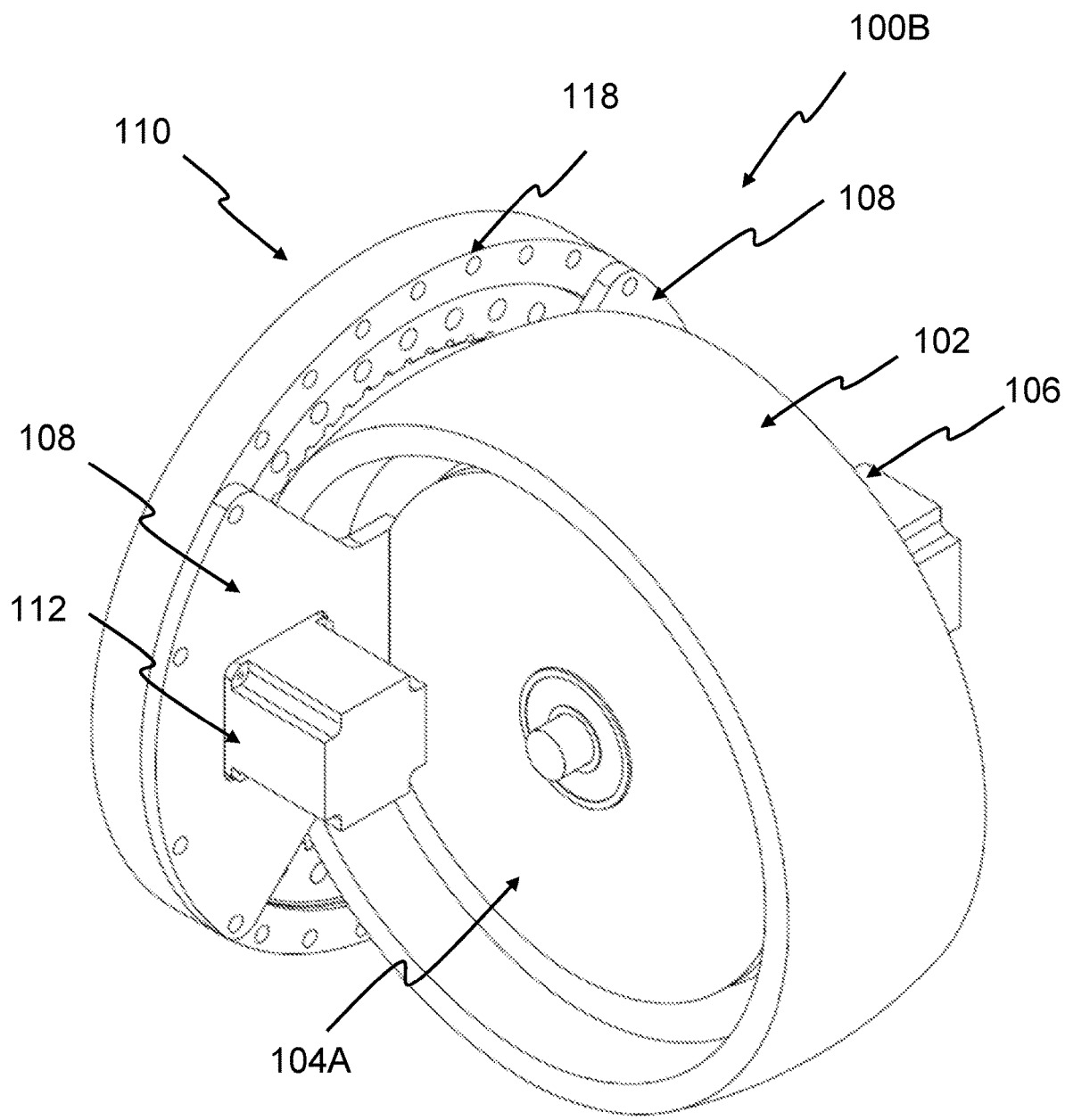
FIG. 6 is a front perspective view of a gyroscopic module according to a third embodiment of the present invention.
Figure 7:
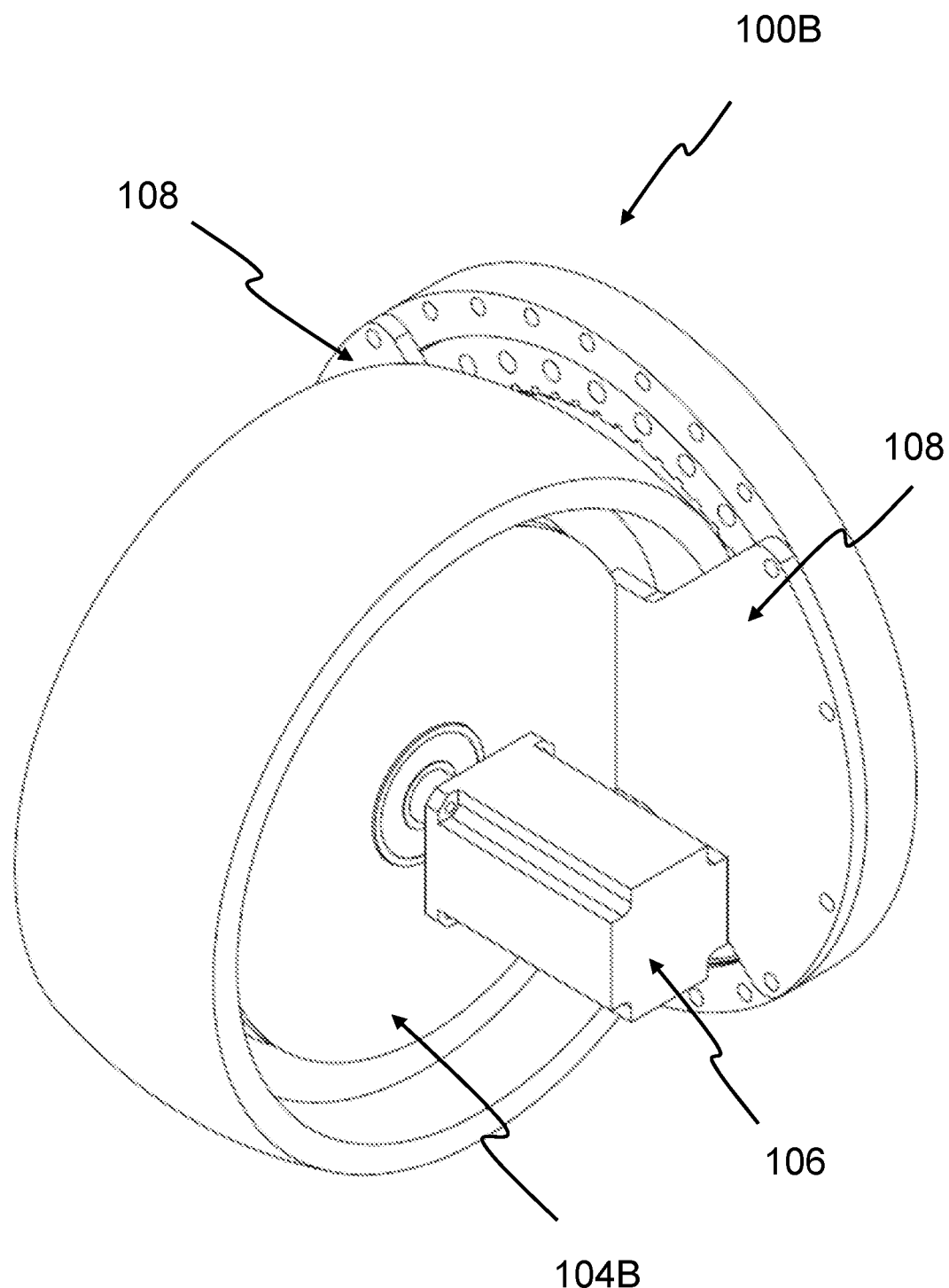
FIG. 7 is a rear perspective view of the gyroscopic module shown in FIG. 6.
Figure 8:
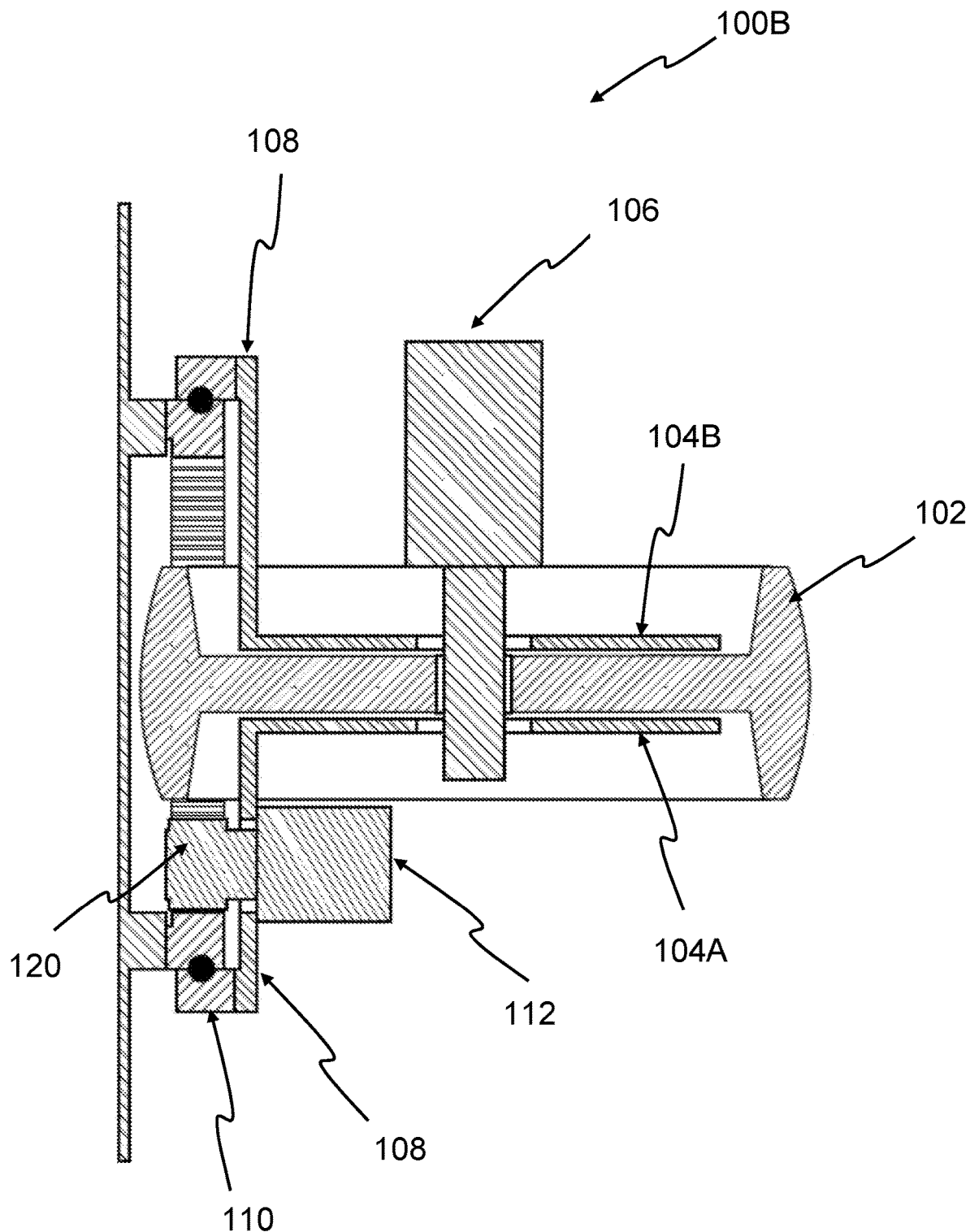
FIG. 8 is a plan sectional view of the gyroscopic module shown in FIG. 7.
Figure 9:
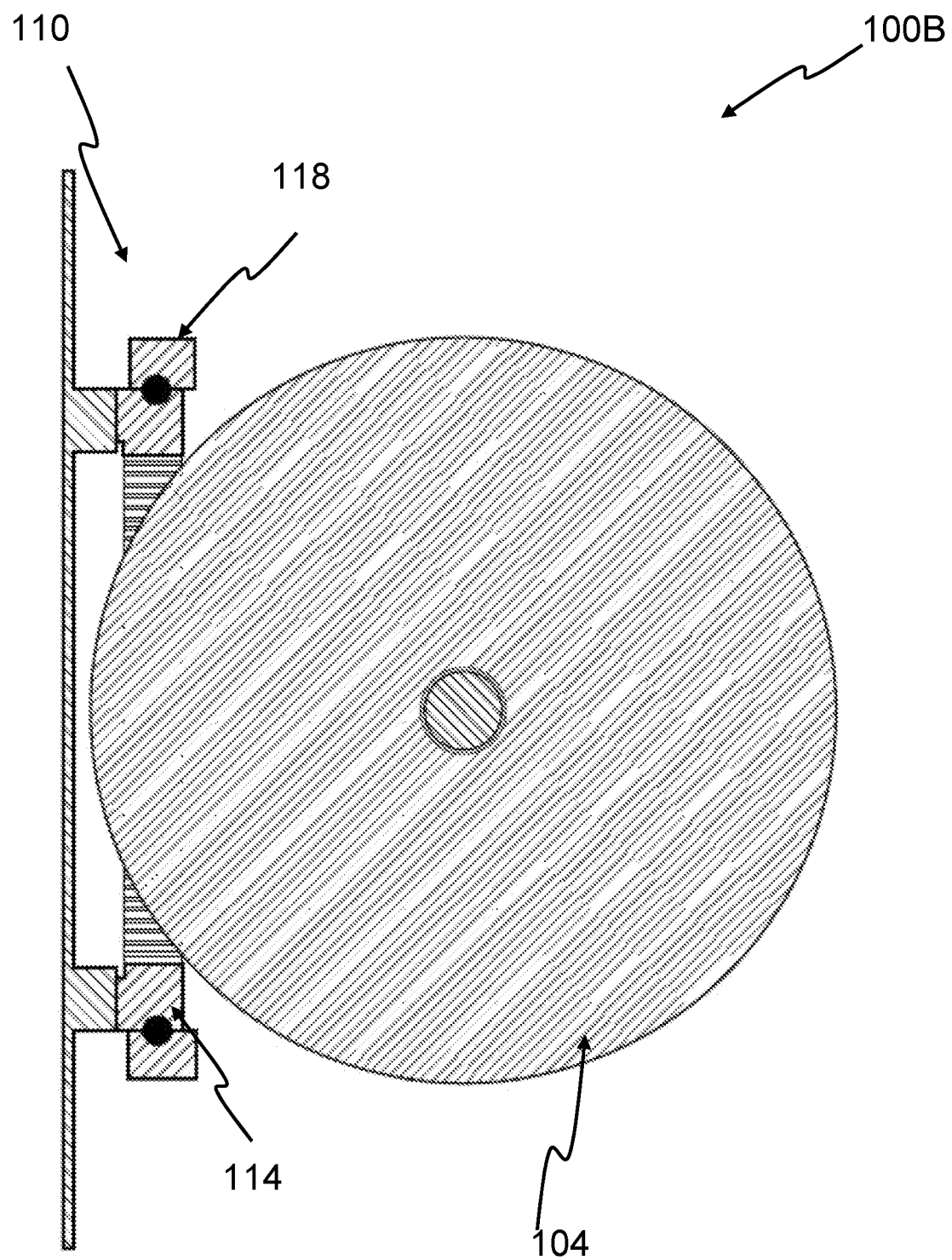
FIG. 9 is a partial front sectional view of the gyroscopic module shown in FIG. 7.
Figure 10:
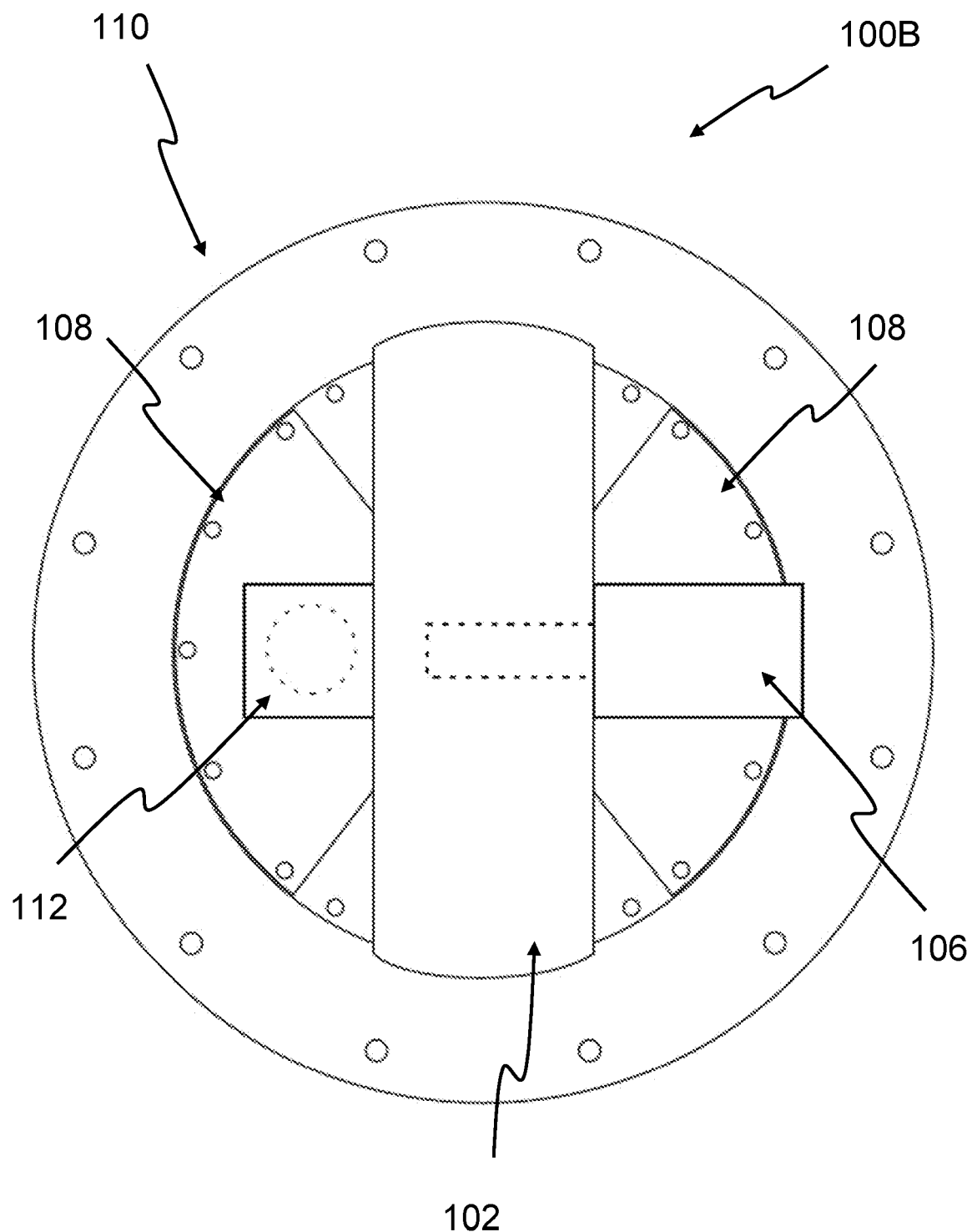
FIG. 10 is a right side view of the gyroscopic module shown in FIG. 7.

With reference to FIGS. 4 and 5, a gyroscopic module 100A according to a second embodiment comprises a single gyroscopic rotor 102 driven by a single first power source 106. A gimbal frame 108 is coupled to each side of the support 104 of the single gyroscopic rotor 102, i.e. a gimbal frame 108 is coupled to each of support plates 104A, 104B. A slew bearing 110 is coupled to each gimbal frame 108 to change an orientation of the single gyroscopic rotor 102. However, in this second embodiment only one of the slew bearings 110 is driven by a respective second power source 112. The outer ring 118 of each of the slew bearings 110 is coupled to a respective gimbal frame 108, but only one of the gimbal frames 108 comprises a second power source 112. The features of the gyroscopic module 100A are otherwise the same as for the gyroscopic module 100 described herein. This embodiment reduces the mass, component count and cost of production of the gyroscopic module 100 compared with the first embodiment.

With reference to FIGS. 6-10, a gyroscopic module 100B according to a third embodiment comprises a single gyroscopic rotor 102 driven by a single first power source 106. A pair of gimbal frames 108 is coupled to one side of the support 104 of the single gyroscopic rotor 102 such that a gimbal frame 108 is coupled to each opposing face of the support 104, i.e. to each of support plates 104A, 104B. In contrast to the first and second embodiments, a single slew bearing 110 is coupled to the pair of gimbal frames 108 to change an orientation of the single gyroscopic rotor 102. The single slew bearing 110 is driven by a single second power source 112. The features of the gyroscopic module 100B are otherwise the same as for the gyroscopic module 100 described herein.

As well as utilising the distributed nature of the rolling elements and races of the slew bearing 110 to enable the smallest possible overall housing size for a given diameter of gyroscopic rotor 102, the use of a single slew bearing 110 instead of one slew bearing at each end fully utilises the characteristic of slew bearings in respect of their very high moment or eccentric load capacity. The use of a single slew bearing 110 to carry the gyroscopic rotor 102 in a control moment gyroscope in a cantilevered arrangement as described in this embodiment further reduces the mass, component count and complexity and will have positive implications for cost in both production of the gyroscopic module 100B and operation compared with the first and second embodiments described herein and the prior art.

Figure 11:
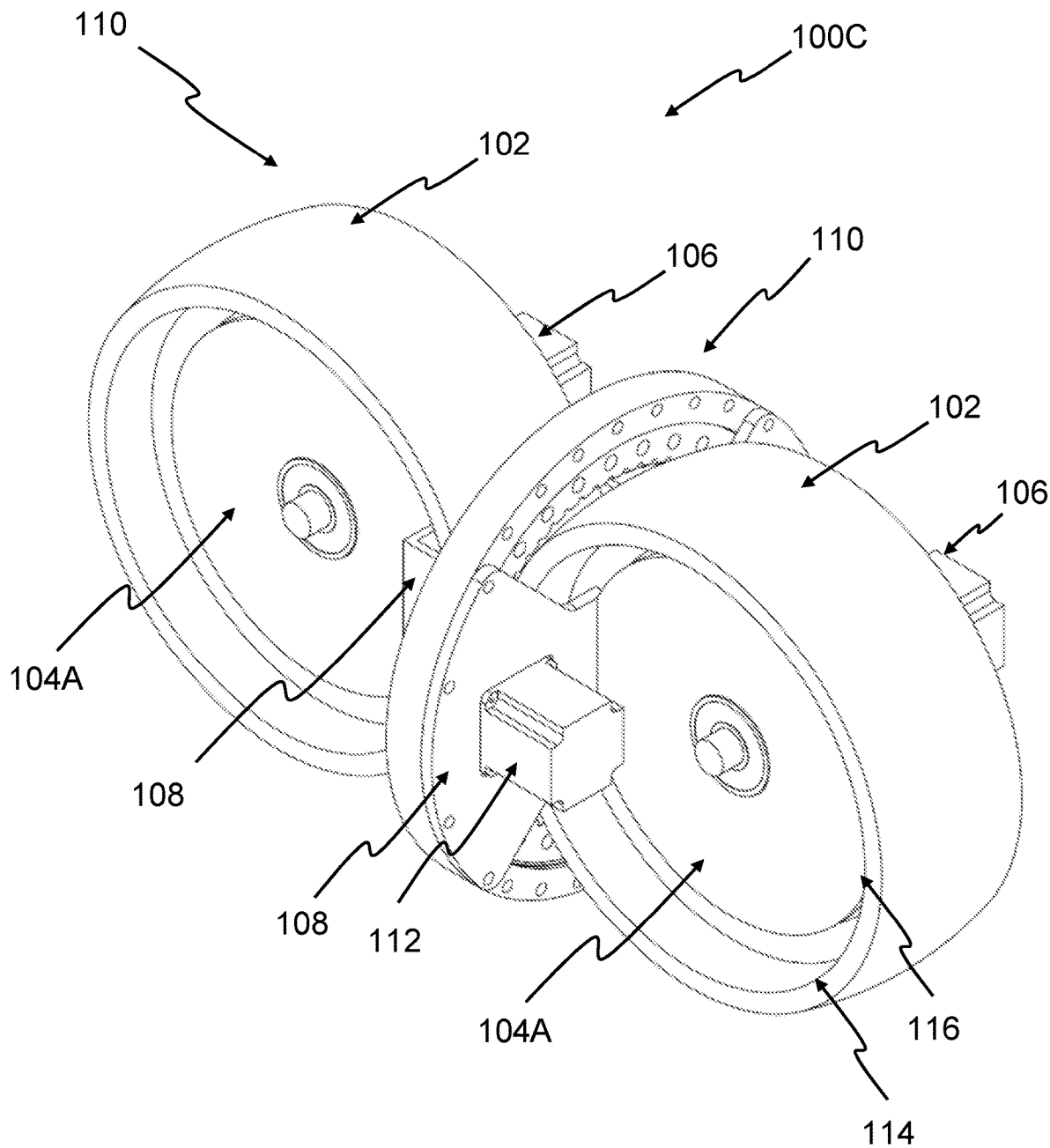
FIG. 11 is a front perspective view of a gyroscopic module according to a fourth embodiment of the present invention.
Figure 12:
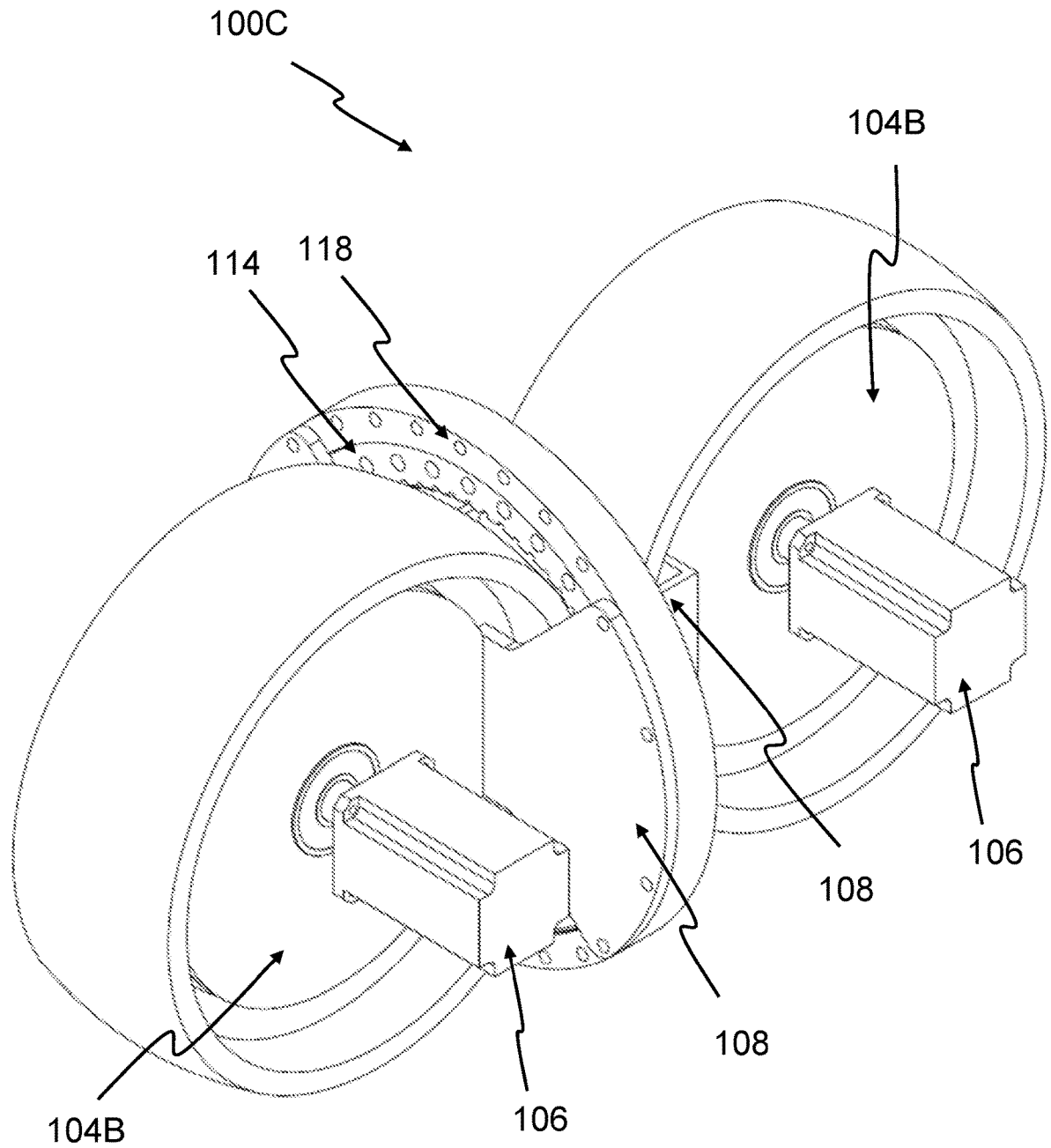
FIG. 12 is a rear perspective view of the gyroscopic module shown in FIG. 11.
Figure 13:
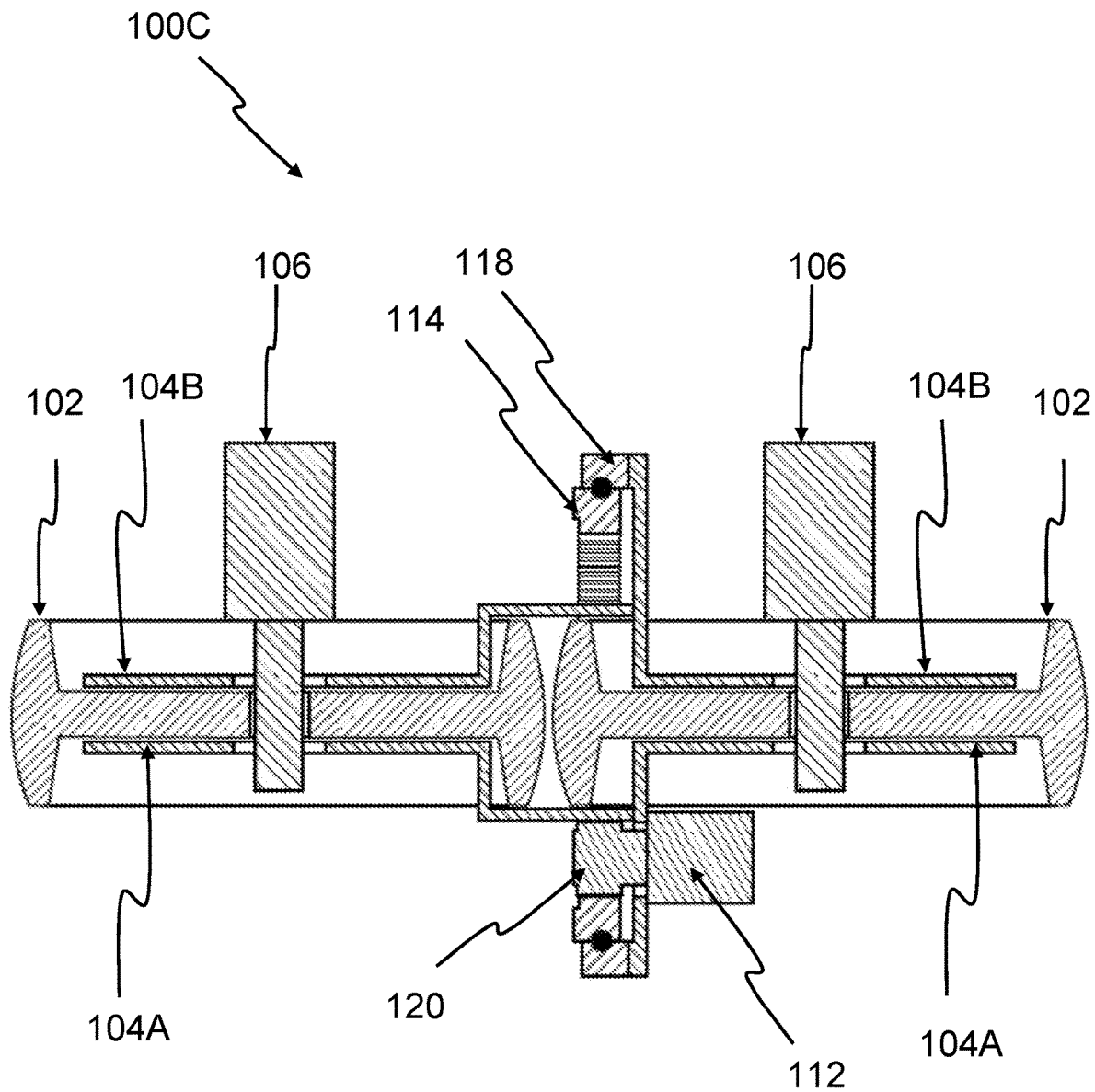
FIG. 13 is a plan sectional view of the gyroscopic module shown in FIG. 11.

With reference to FIGS. 11-13, a gyroscopic module 100C according to a fourth embodiment comprises two gyroscopic rotors 102 driven by a respective first power source 106 such that the gyroscopic module comprises two first power sources 106. The gyroscopic module 100C according to this embodiment comprises a pair of gimbal frames 108 coupled to each side of the support 104, i.e. to each of support plates 104A, 104B of at least one of the two gyroscopic rotors 102. In the embodiment shown in FIGS. 11-13, a gimbal frame 108 is coupled to each side of the support 104, i.e. to each of support plates 104A, 104B, for each of the two gyroscopic rotors 102 such that there are four gimbal frames 108. However, all four gimbal frames 108 need not be the same shape or configuration. A single slew bearing 110 is coupled to each gimbal frame 108 and between the two gyroscopic rotors 102. More specifically, each gimbal frame 108 is coupled to the outer ring 118 of the slew bearing 110. The slew bearing 110 is driven by a single second power source 112 mounted to one of the gimbal frames 108 to change an orientation of the two gyroscopic rotors 102 simultaneously. The single second power source 112 is coupled to a pinion gear 120 that engages with the ring gear 116 of the fixed inner ring 114 of the slew bearing 110 as described in relation to the preceding embodiments.

Whilst this embodiment has a greater mass, higher component count and higher cost of production compared with the first, second and third embodiments described herein, a larger moment can be generated than in the first, second and third embodiments and in a smaller volume than prior art gyroscopic modules capable of generating the same moment. While overall size and mass will always be a factor in market acceptance and utility, there are applications where the length of the gyroscopic modules 100 is not critical, for example, where the control moment gyroscopic modules 100 are fully housed in a lifting beam or spreader bar. In such applications the overall length of the lifting beam is set by the need to spread lifting chains or slings to properly support the suspended load, and this requirement will often dictate the overall length of the apparatus in excess of that driven by the gyroscopic rotors 102. While the overall length of the gyroscopic module 100 in these applications is no longer critical, the diameter of the complete unit will be, thus affecting, amongst other things, the ability to carry the lifting beam on the crane between lifts, and the usability of the equipment in confined spaces. In keeping with the outside diameter of the gyroscopic rotors 102 setting the limit on available moment output, the use of two gyroscopic rotors 102 in a single gyroscopic module 100C doubles the capacity without any increase in lifting beam diameter.

Figure 14:
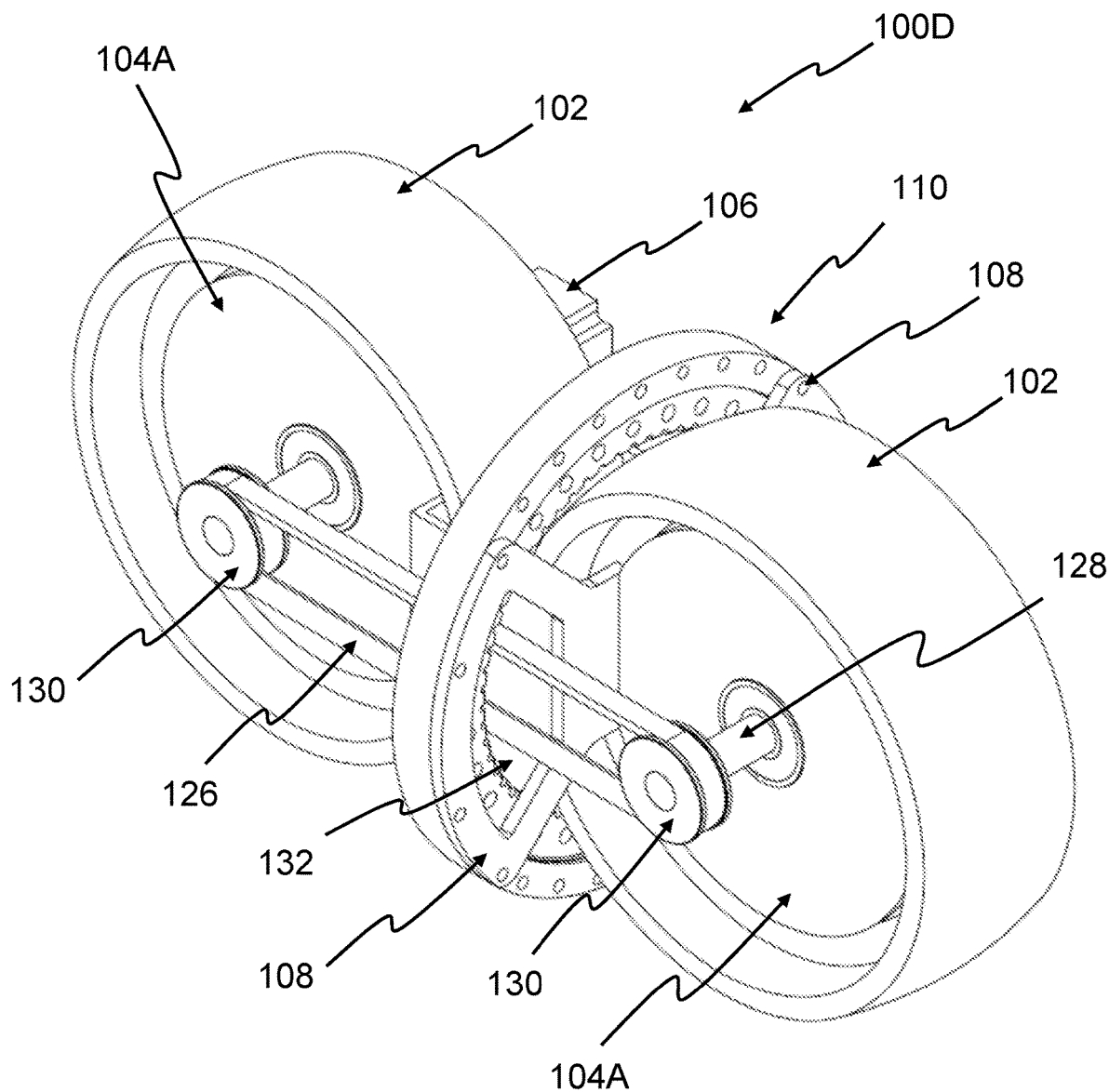
FIG. 14 is a front perspective view of a gyroscopic module according to a fifth embodiment of the present invention.
Figure 15:
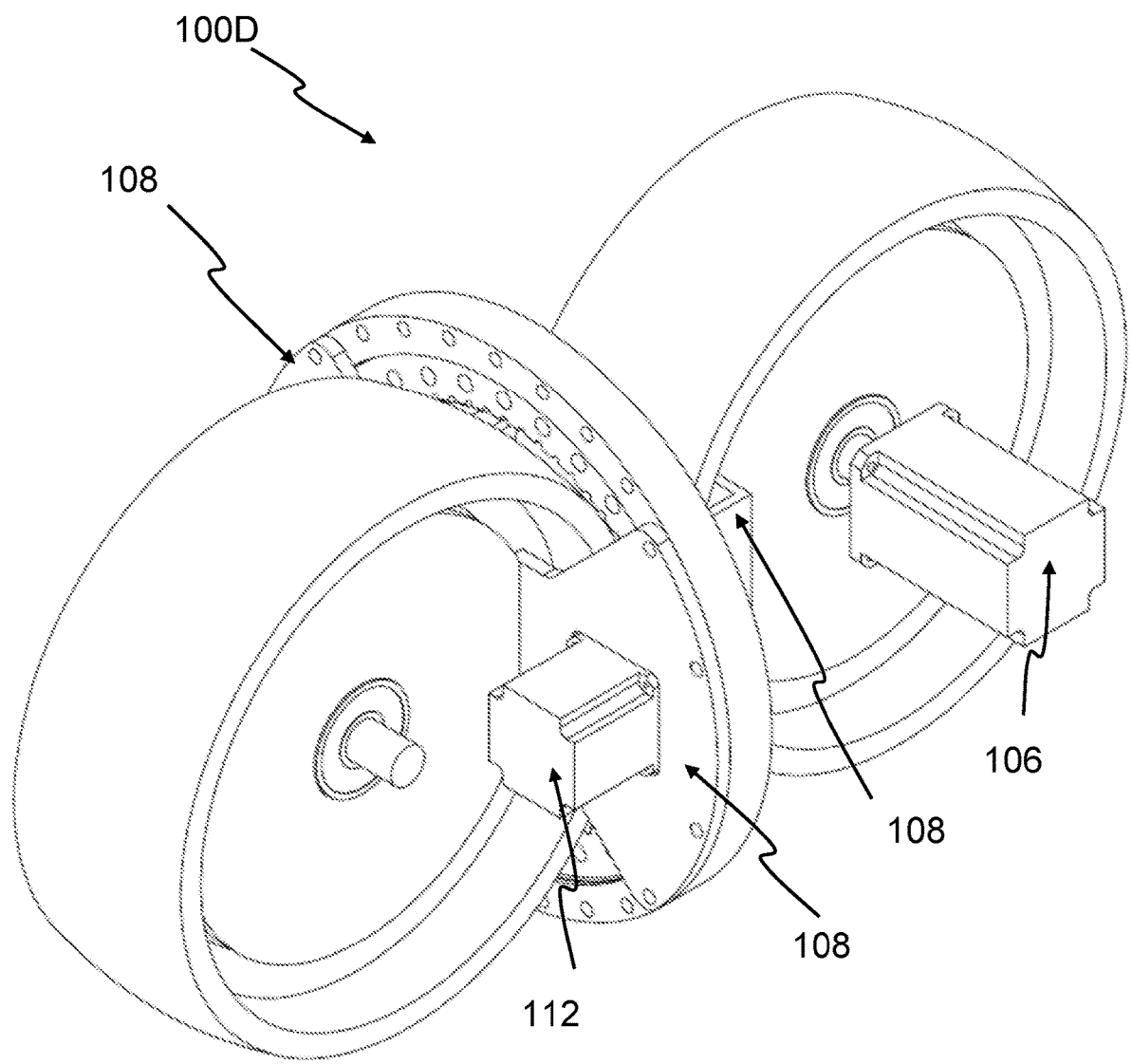
FIG. 15 is a rear perspective view of the gyroscopic module shown in FIG. 14.

With reference to FIGS. 14 and 15, a gyroscopic module 100D according to a fifth embodiment comprises two gyroscopic rotors 102 driven by a single first power source 106. A pair of gimbal frames 108 is coupled to each side of the support 104, i.e. to each of support plates 104A, 104B, of at least one of the two gyroscopic rotors 102 and preferably both of the gyroscopic rotors 102. A slew bearing 110 is coupled to each gimbal frame 108 and between the two gyroscopic rotors 102. The slew bearing 110 is driven by a single second power 112 source to change an orientation of the two gyroscopic rotors simultaneously.

In this embodiment, a belt, chain or other endless loop 126 or the like couples the two gyroscopic rotors 102 such that a first one of the two gyroscopic rotors is driven by the single first power source 106 and a second one of the two gyroscopic rotors 102 is driven by the belt, chain or other endless loop 126 or the like. Ends of a shaft 128 of each gyroscopic rotor 102 can comprise a pulley 130 for receiving the belt, chain or other endless loop 126. At least one of the gimbal frames 108 comprises an aperture 132 allowing the passage therethrough of the belt, chain or other endless loop 126 or the like coupled between the two gyroscopic rotors 102.

In contrast to the embodiment described above in relation to FIGS. 11-13 in which each first power source 106 has to be mounted, powered, controlled and monitored, belt, chain or other endless loop drives are simple, inexpensive, reliable, and have minimal installation or on-going costs. The use of a belt, chain or other endless loop drive therefore allows for doubling of the output of the gyroscopic module 100D for minimal penalties in terms of cost, size or complexity.

Figure 16:
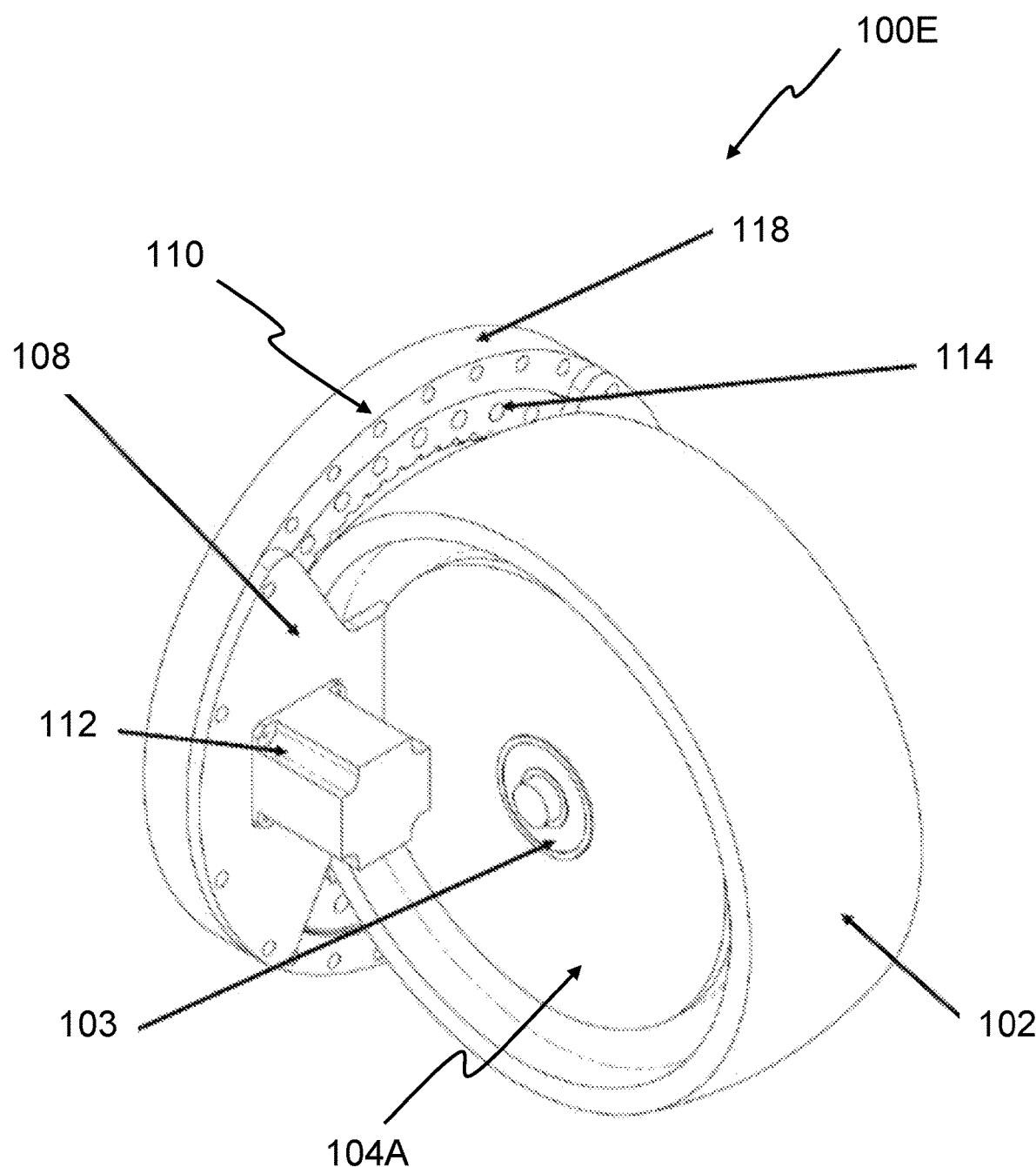
FIG. 16 is a front perspective view of a gyroscopic module according to a sixth embodiment of the present invention.
Figure 17:
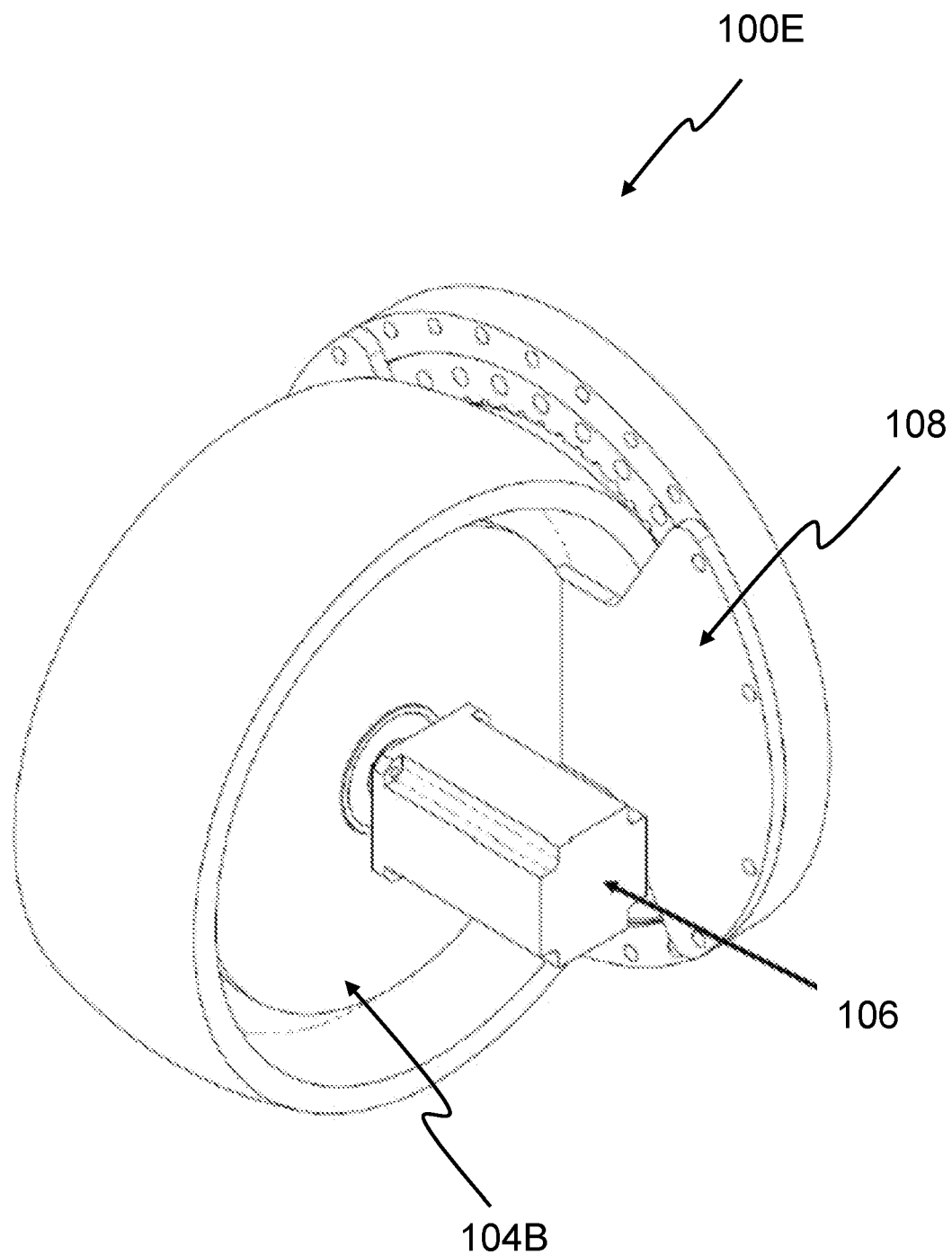
FIG. 17 is a rear perspective view of the gyroscopic module shown in FIG. 16.
Figure 18:
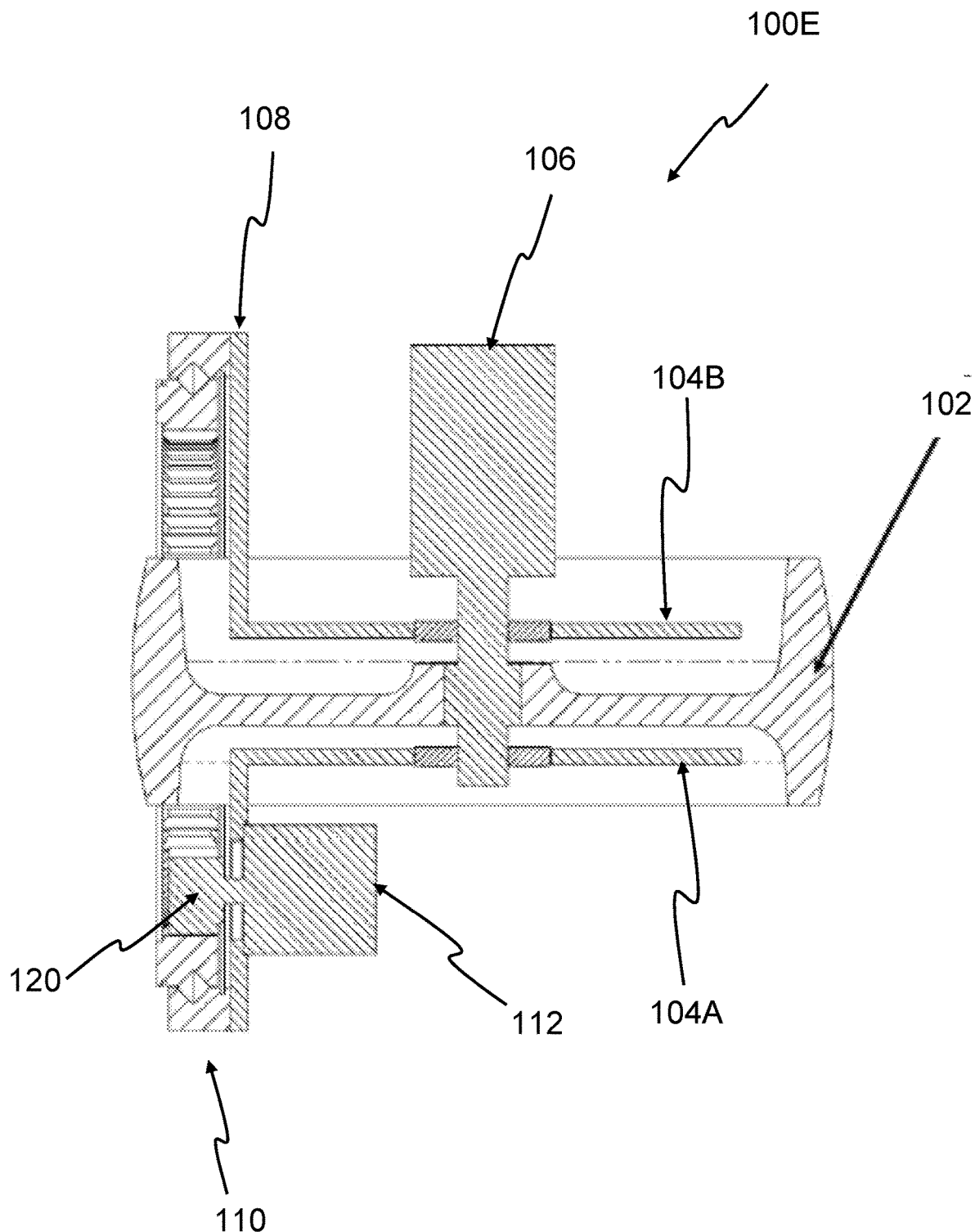
FIG. 18 is a front sectional view of the gyroscopic module shown in FIG. 16.

Whilst the gyroscopic rotors 102 described in the preceding embodiments are all symmetrical, it is envisaged that space constraints with smaller gyroscopic modules may dictate the use of eccentric rotors wherein the support 104 (web or centre section) is offset to optimise space for bearings and motors, as shown in FIGS. 16-18. In a gyroscopic module 100E according to a sixth embodiment, the support, web or centre 104 comprising support plates 104A, 104B is mounted to the drive shaft of the rotor drive motor 106 via rotor bearing 103 as in previous embodiments. However, compared to the embodiment shown in FIGS. 6-10, the support, web or centre 104 is offset to one side transverse to an axis of the drive shaft of the rotor drive motor 106. This is most apparent through comparison of the cross-sectional view shown in FIG. 18, showing the eccentric rotor, with the cross-sectional view shown in FIG. 8 in which the support, web or centre 104 of the rotor 102 is positioned centrally.

Figure 19:
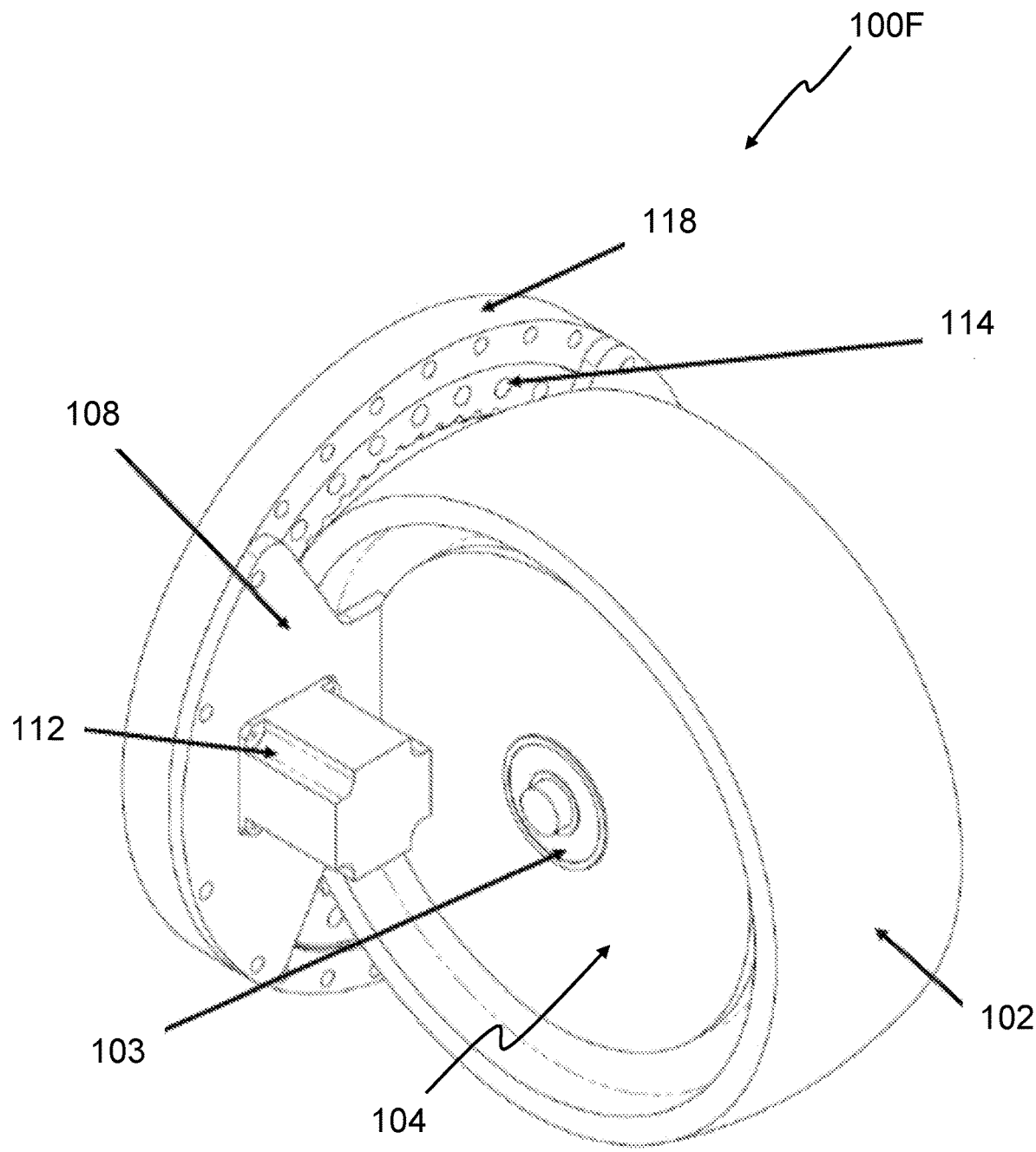
FIG. 19 is a front perspective view of a gyroscopic module according to a seventh embodiment of the present invention.
Figure 20:
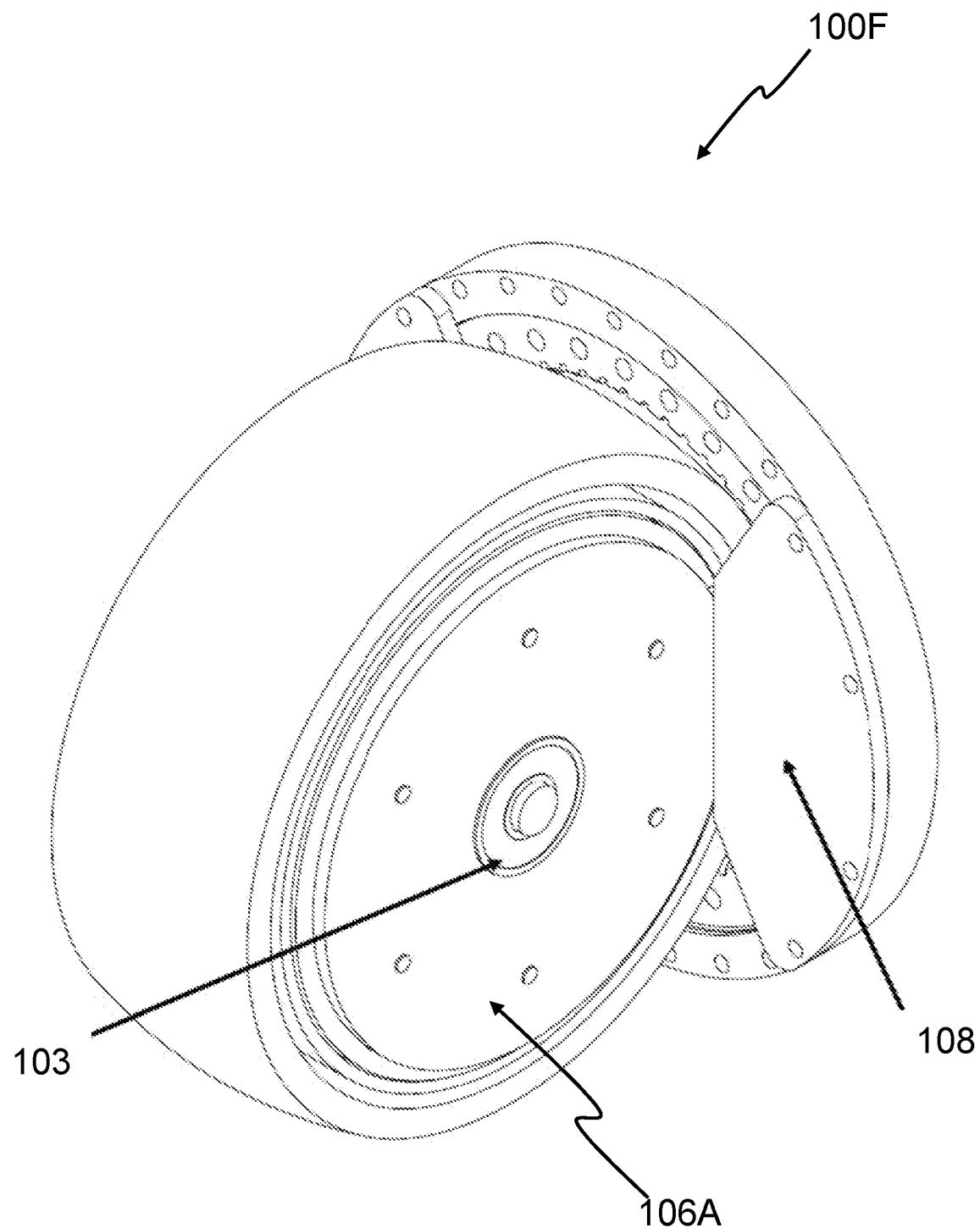
FIG. 20 is a rear perspective view of the gyroscopic module shown in FIG. 19.
Figure 21:
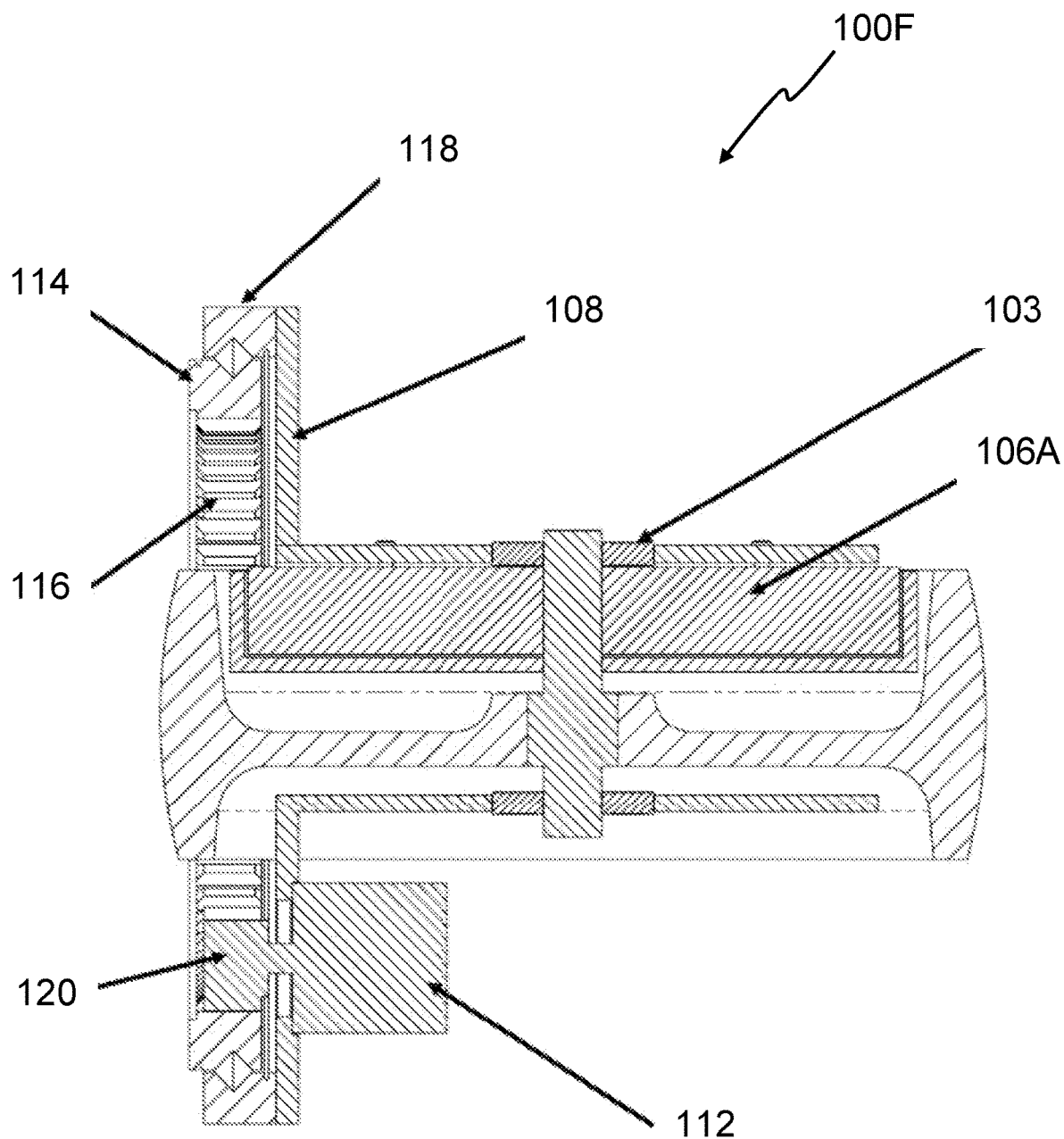
FIG. 21 is a front sectional view of the gyroscopic module shown in FIG. 19.

With reference to FIGS. 19-21, according to a seventh embodiment of the gyroscopic module 100F, improvements or variations to the rotor drive motor 106 include using a custom-made hub or wheel type motor 106A, wherein the gyroscopic rotor 102 is an integral part of the construction of the motor 106A. This has been envisaged as a possible longer-term improvement, and it is likely to become more critical in the smaller sizes of gyroscopic module of the present invention. The integral construction of the rotor motor and the rotor reduces the component count and the number of moving parts, such as bearings, and frees up space, compared with using the motor 106 described in the previous embodiments. The freed-up space may be used for other purposes, such as sensors or other components, as described in PCT/AU2016/050941. It is envisaged that the hub or wheel type motor 106A can be used with the concentric rotors or the eccentric rotors as described herein.

Figure 22:
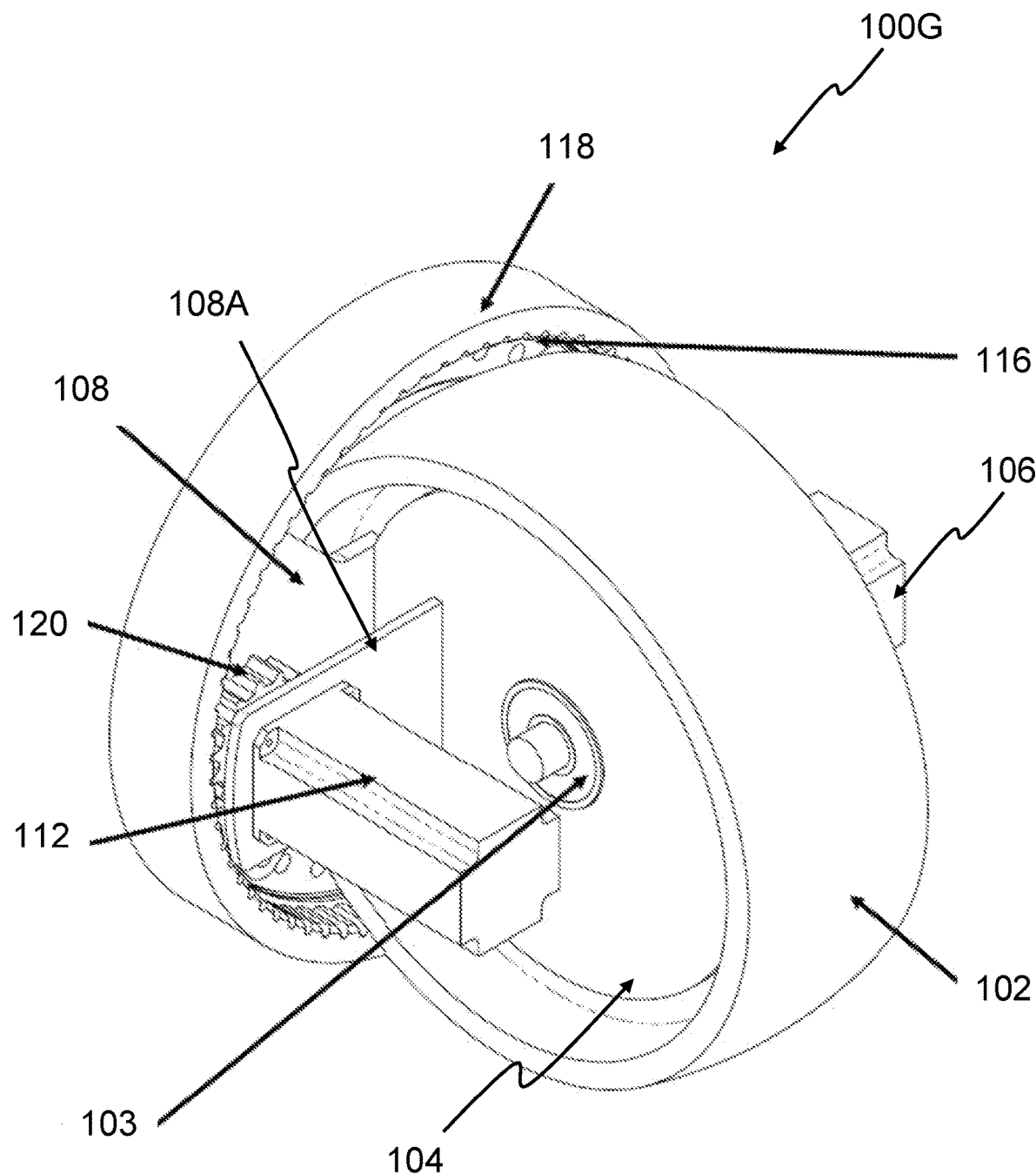
FIG. 22 is a front perspective view of a gyroscopic module according to an eighth embodiment of the present invention.
Figure 23:
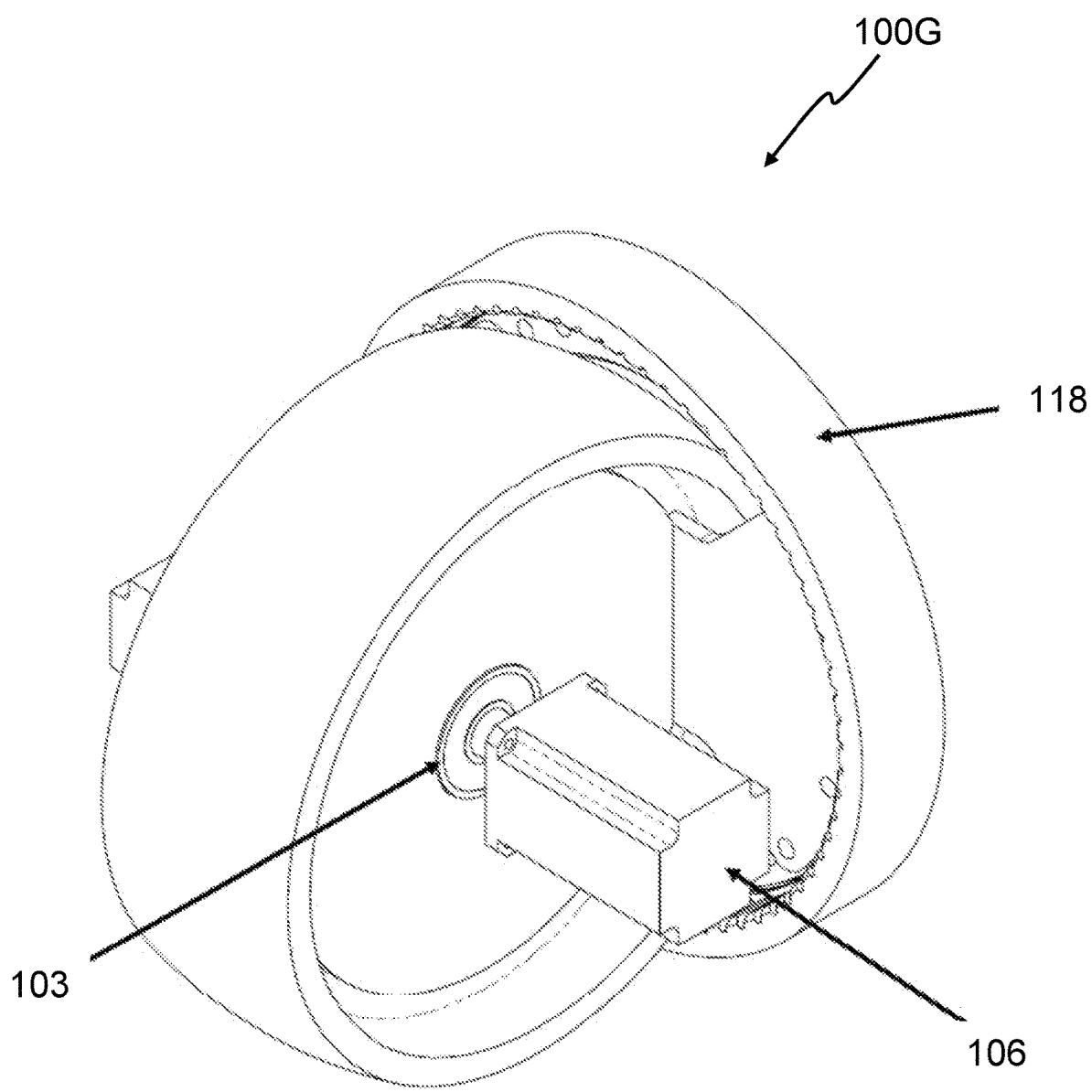
FIG. 23 is a rear perspective view of the gyroscopic module shown in FIG. 22.
Figure 24:
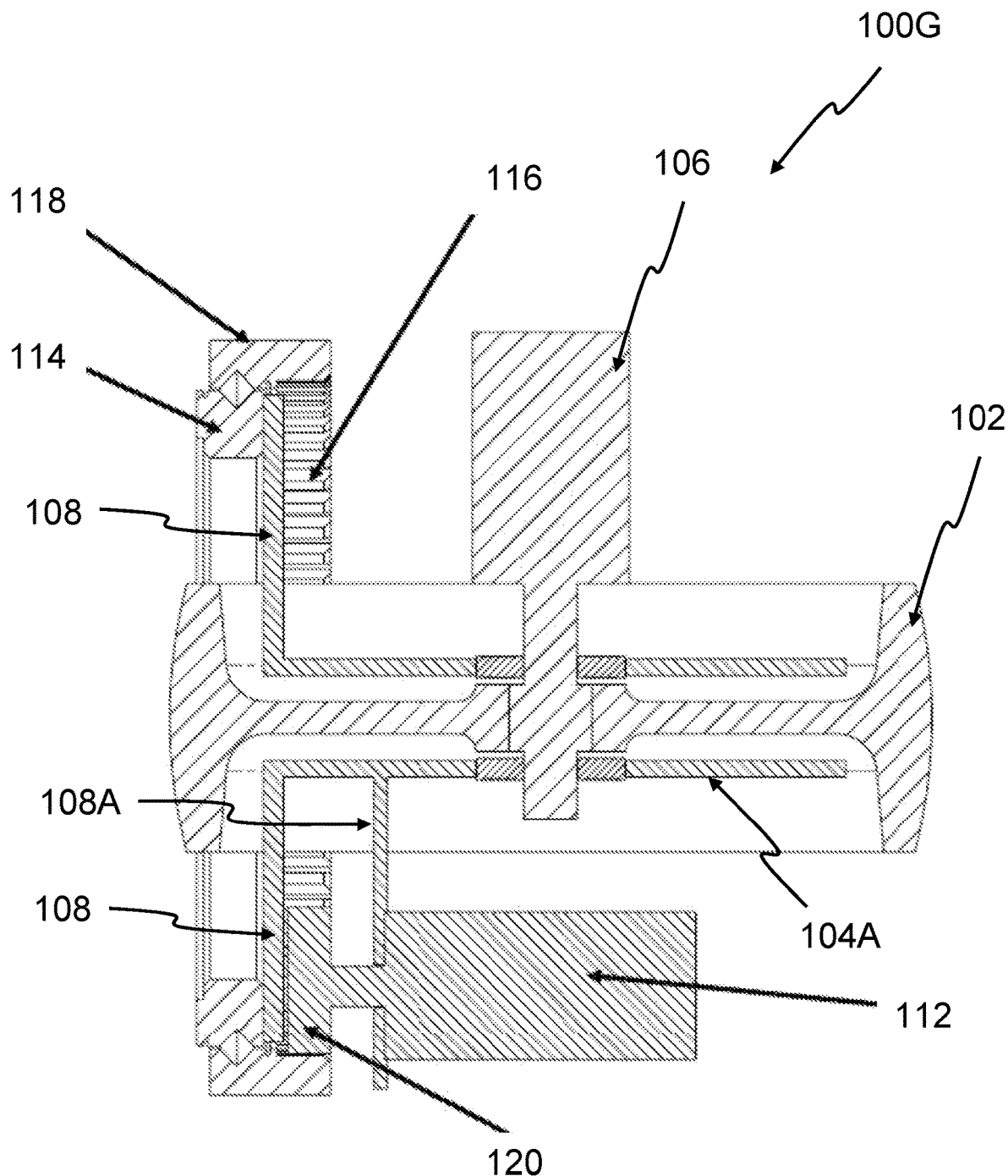
FIG. 24 is a front sectional view of the gyroscopic module shown in FIG. 22.
Figure 25:
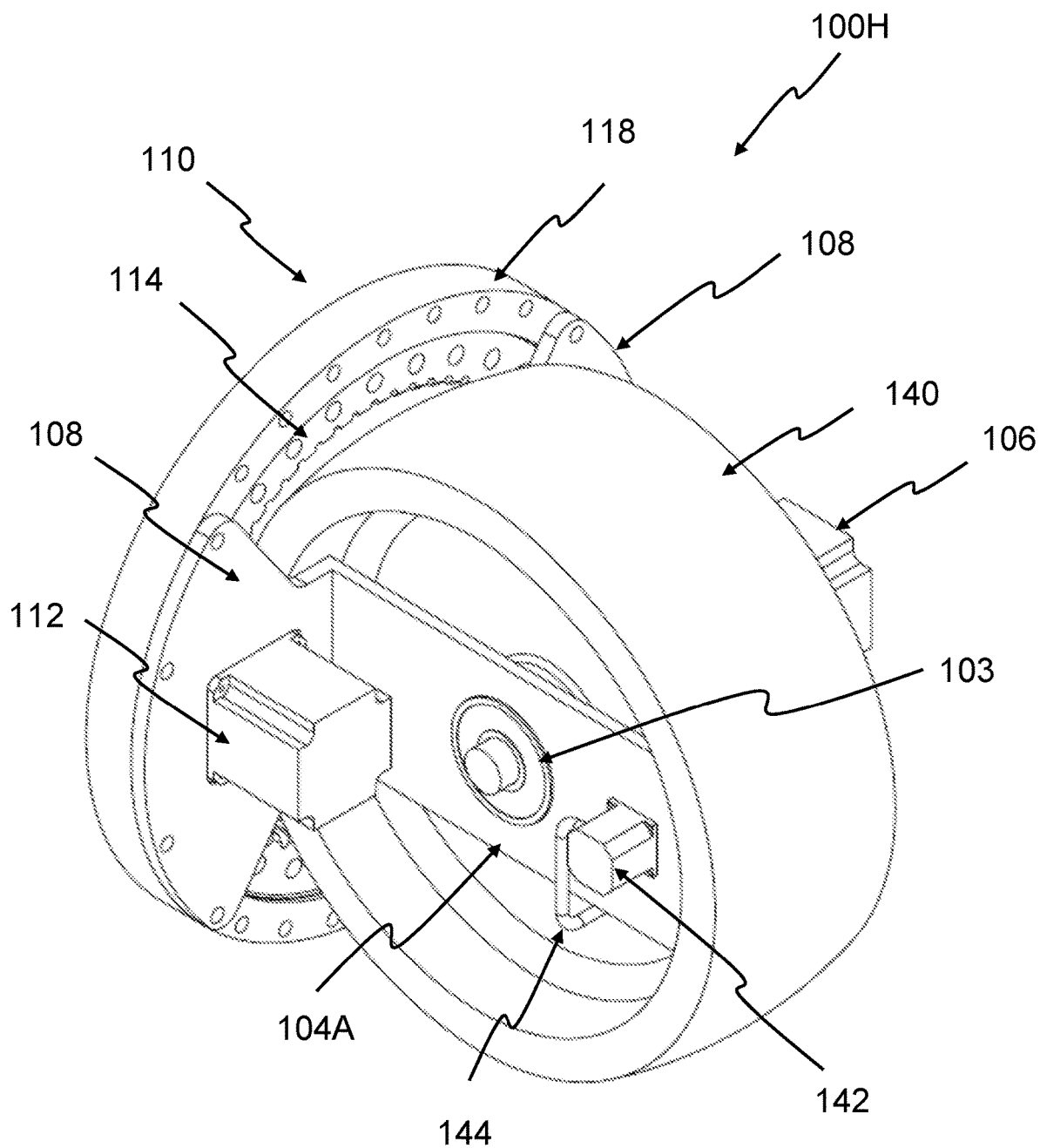
FIG. 25 is a front perspective view of a gyroscopic module according to a ninth embodiment of the present invention.
Figure 26:
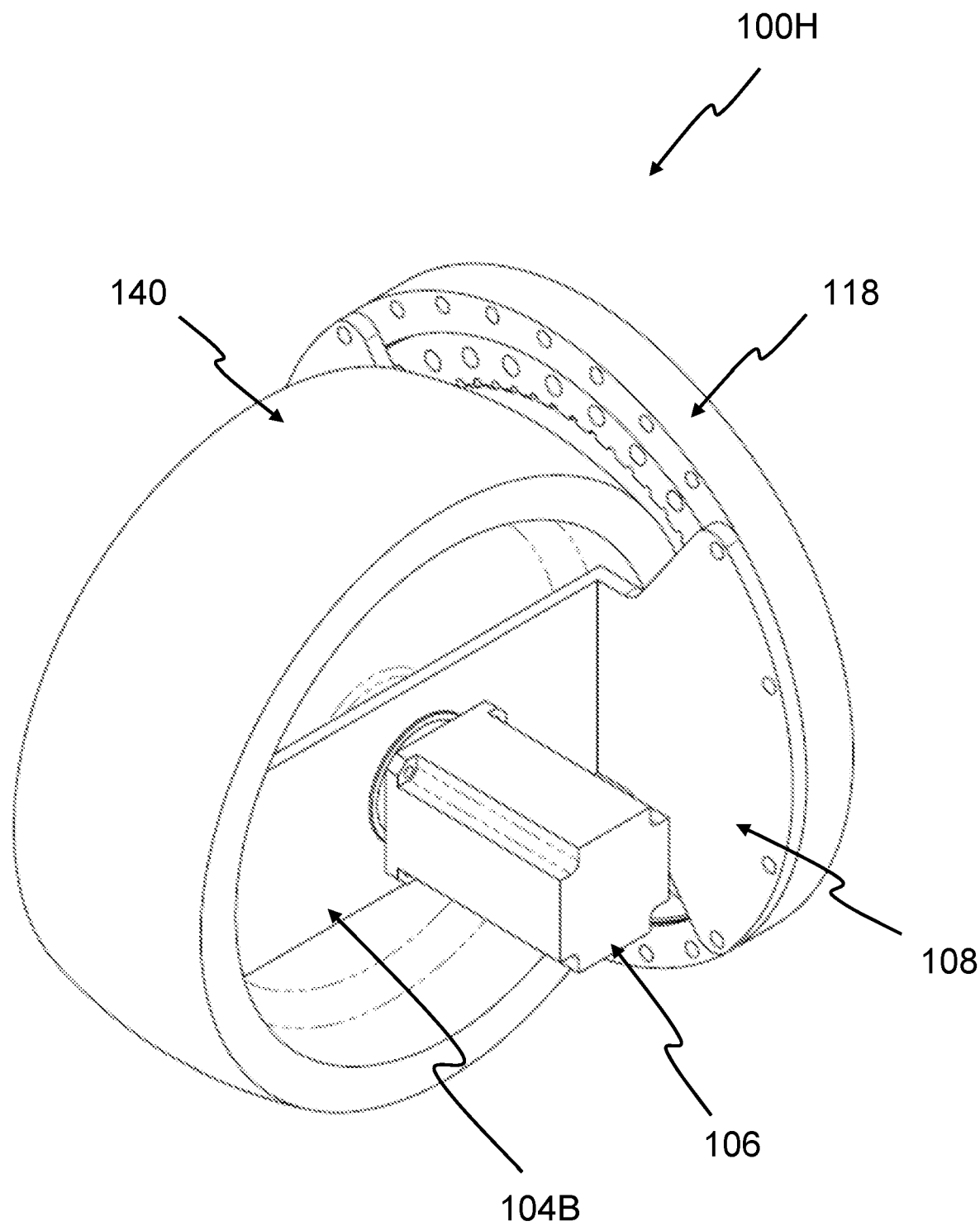
FIG. 26 is a rear perspective view of the gyroscopic module shown in FIG. 25.
Figure 27:
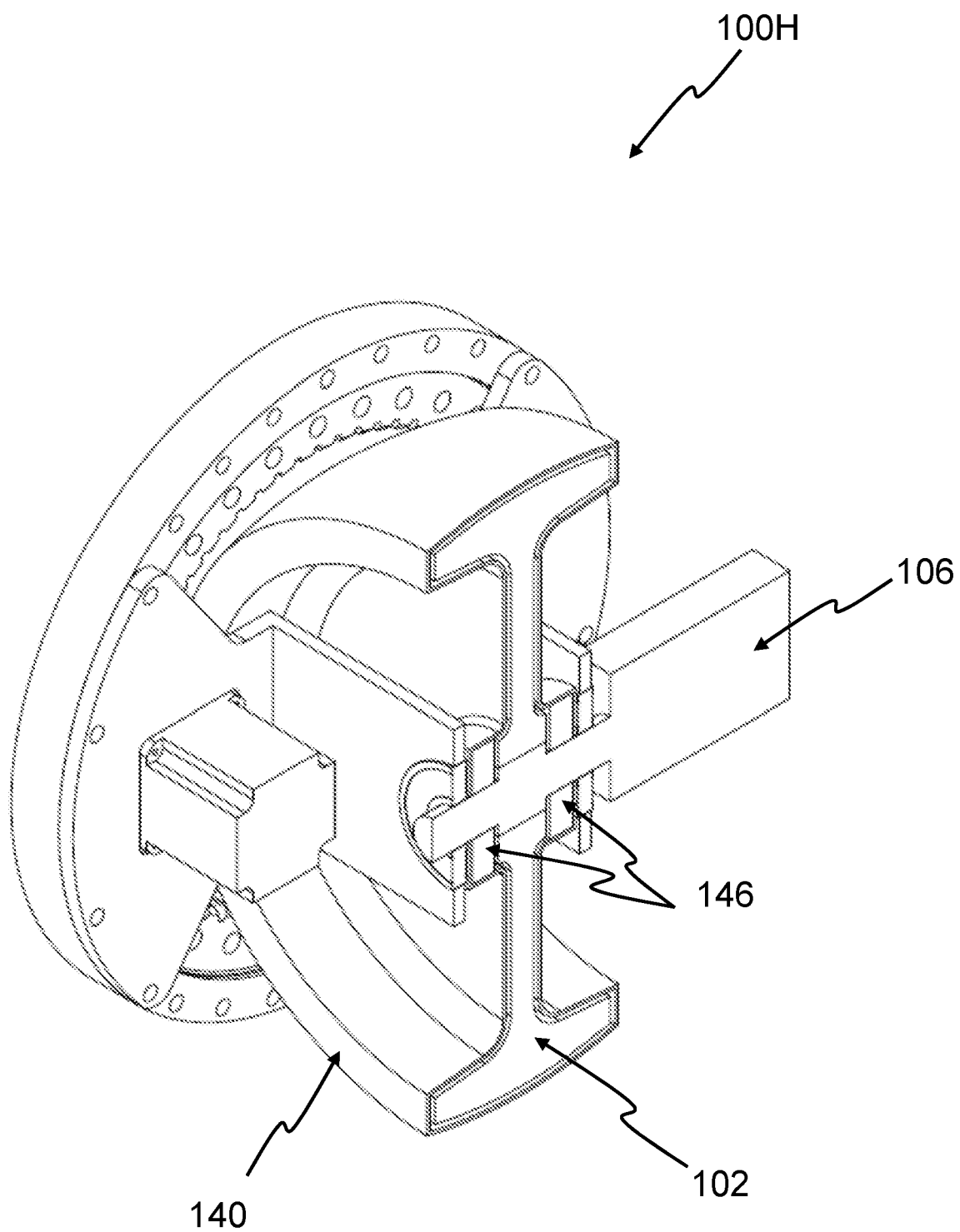
FIG. 27 is a sectional front perspective view of the gyroscopic module shown in FIG. 25.
Figure 28:
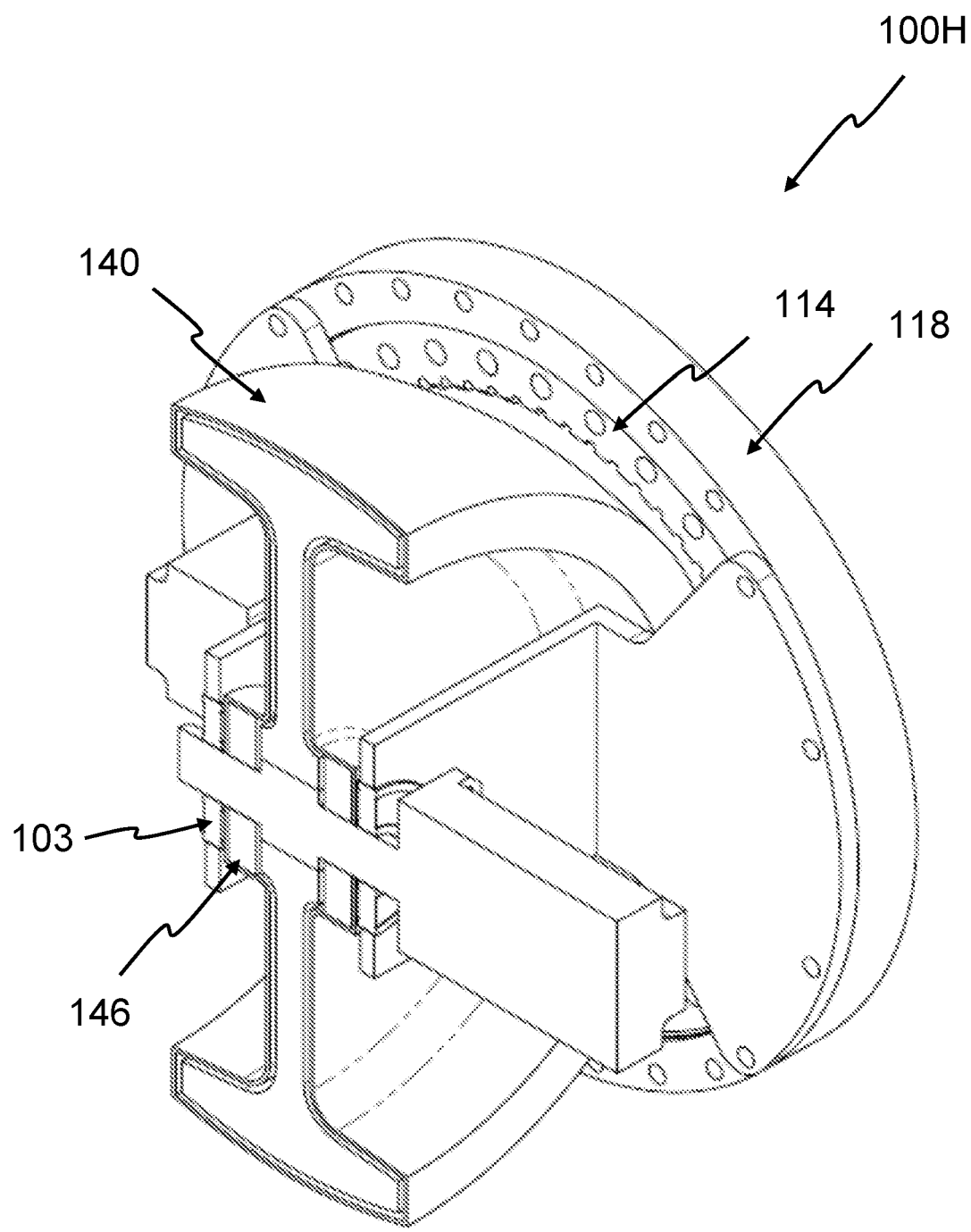
FIG. 28 is a sectional rear perspective view of the gyroscopic module shown in FIG. 25.
Figure 29:
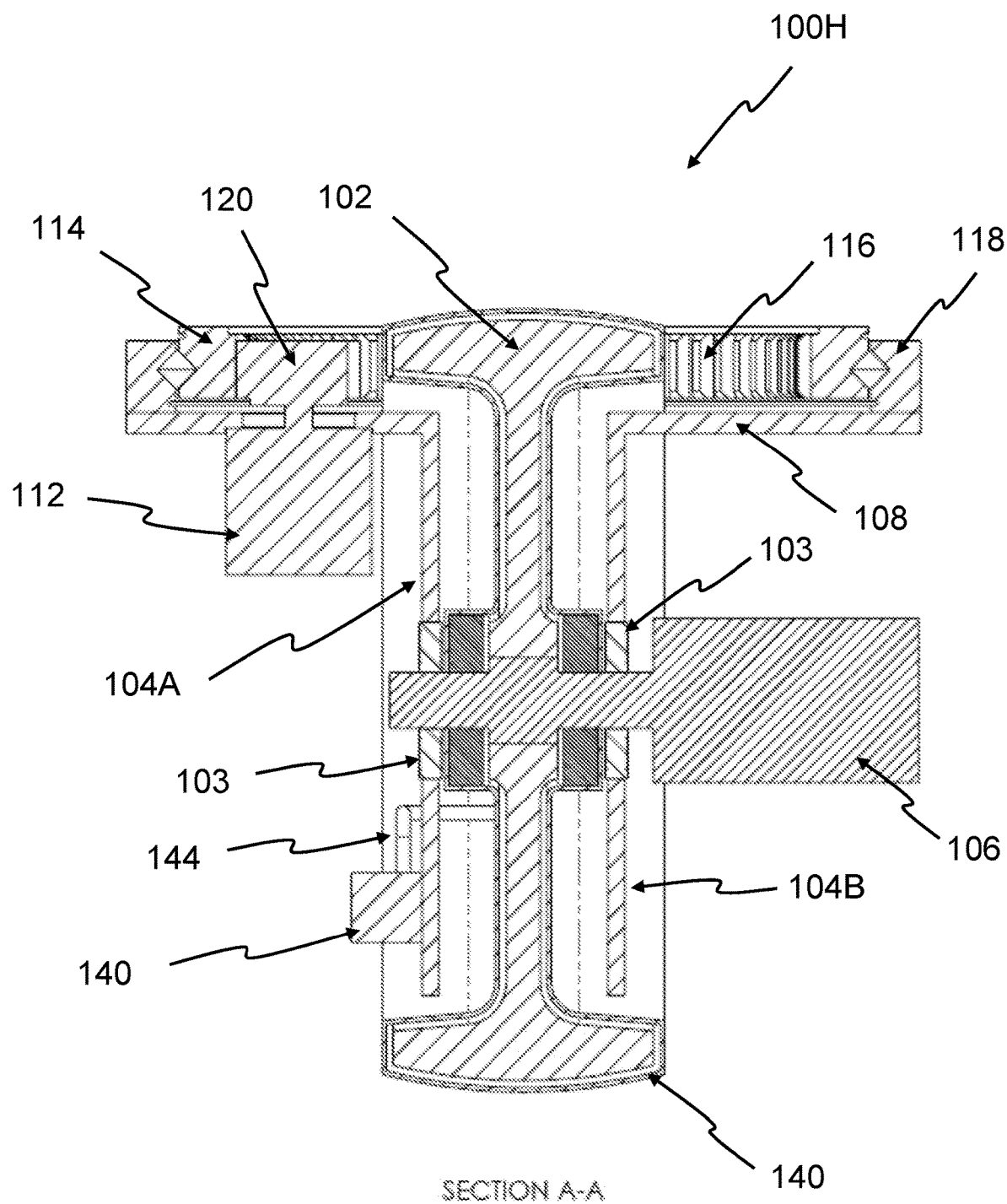
FIG. 29 is a plan sectional view of the gyroscopic module shown in FIG. 25.

With reference to FIGS. 22-24, a yet further, or eighth embodiment of the gyroscopic module 100G comprises an offset second power source or gimbal drive 112 coupled to the ring gear 116 via pinion gear 120 which includes numerous departures from previous embodiments described herein. In such embodiments, the inner ring 114 of the slew bearing rotates and the outer ring 118 is fixed whereas in the previous embodiments it is the other way around. Secondly, in such embodiments, the ring gear 116 for the gimbal drive is offset or brought forward towards the rotor 102 and stretched outwards to form the outermost part of the slew bearing rather than being well inside. This creates sufficient clearance in the smaller gyroscopic modules for the substantial size of the larger second power source or gimbal drive motor 112 while still allowing for a relatively thick rotor 102 without increasing either the overall diameter or length of the gyroscopic module 100. Thirdly, the second power source or gimbal drive motor 112 is mounted to an additional, offset gimbal frame 108A, which is coupled to the front support plate 104A of the support 104. Offset gimbal frame 108A is additional to gimbal frames 108 coupled to the fixed outer ring 118. The ring gear 116 could be made integral with the slew bearing, or it could be made as a separate ring and then bolted or shrunk on to the slew bearing itself.

With reference to FIGS. 25-29, a ninth embodiment of the gyroscopic module 100H comprises a gyroscopic rotor 102 rotatably mounted to a support 104 comprising front and rear support plates 104A, 104B, which are coupled to, or extensions of gimbal frames 108. Gyroscopic rotor 102 is rotatably mounted to the drive shaft of the first power source in the form of rotor drive motor 106 via rotor bearing 103. Gimbal frames 108 are mounted to the outer ring 118 of the slew bearing 110. The second power source or gimbal drive motor 112 is mounted to one side of one of the gimbal frames 108. The drive shaft of the second power source 112 is coupled to pinion gear 120 on the opposite side of the gimbal frame 108 and pinion gear engages with the ring gear 116 of the inner ring 114 of the slew bearing 110.

In this embodiment, gyroscopic rotor 102 rotates within a vacuum, or partial contained within a stationary, hollow vacuum cover 140 fixed to, for example, the front and rear support plates 104A, 104B of the support 104 by any suitable means. A vacuum pump 142 is mounted to one of the front or rear support plates 104A, 1046 and conduit 144 couples the vacuum pump 142 to the interior of the hollow vacuum cover 140. Rotating seals 146 are provided within the hollow vacuum cover 140 to provide a seal against the shaft of the first power source 106.

Aerodynamic losses are significant at operating speeds of gyroscopic modules which increases the size of the first power source and hence the battery, controllers and wiring. The high load on the first power source 106 also generate losses in the form of heat which need to be reduced or eliminated.

The vacuum can be partial or full because any reduction in air density will reduce drag proportionally. The vacuum cover 140 can be close fitting as shown or larger, but it is useful for the vacuum cover 140 to not enclose the shaft bearings of the first power source 106 or the first power source 106 so they do not generate heat inside the evacuated or partially evacuated volume the vacuum cover 140 which would be difficult to remove. The vacuum pump 142 can be run continuously or it can be cycled on, i.e. on demand, only if and when any leakage past the seals 146 allows the internal pressure to climb above a pre-set amount.

The vacuum cover 140 can be completely symmetrical and close fitting all around the shape of the gyroscopic rotor 102, i.e. the cross-sectional shape of the vacuum cover 140 substantially conforms to the cross-sectional shape of the gyroscopic rotor 102, as shown in FIGS. 25-29. Alternatively, the vacuum cover 140 can be shaped differently so that at least part of the vacuum cover 140 forms structural support for one or more components of the gyroscopic module, such as the shaft bearings of the gyroscopic rotor 102, and/or the first power source 106 in the form of a high-speed motor, and/or other brackets, such as cable supports or the like. The pressure build-up due to leakage past the seals 146 is independent of the internal volume so it is irrelevant if the internal volume is much larger than the gyroscopic rotor 102. The vacuum cover 140 can be provided in two or more parts, for example split horizontally or vertically, to enable the vacuum cover 140 to be placed over and around the gyroscopic rotor 102.

Lowering the pressure around the gyroscopic rotors 102 will allow the same operating speeds with smaller first power sources 106 and batteries, or higher operating speeds for the same size first power sources 106 and batteries, or some combination of both.

In another form, the present invention resides in a method of changing an orientation of at least one gyroscopic rotor 102 in a gyroscopic module 100-100H. The gyroscopic module 100-100H comprises at least one gyroscopic rotor 102 rotatably mounted to a support 104 and at least one first power source 106 coupled to the at least one gyroscopic rotor 102. The gyroscopic module 100-100H comprises at least one gimbal frame 108 coupled to the support 104 of the at least one gyroscopic rotor 102 and at least one slew bearing 110 coupled to the at least one gimbal frame 108. At least one second power source 112 is mounted to the at least one gimbal frame 108. The method comprises driving the at least one slew bearing with the at least one second power source 112 to change an orientation of the at least one gyroscopic rotor 102.

In a further form, the present invention resides in a method of changing an orientation of at least one gyroscopic rotor 102 in a gyroscopic module 100-100H. The method comprises i) rotatably mounting at least one gyroscopic rotor 102 to a support 104; ii) coupling at least one gimbal frame 108 to the support 104 of the at least one gyroscopic rotor 102; iii) coupling at least one slew bearing 110 to the at least one gimbal frame 108; iv) driving the at least one gyroscopic rotor 102 by at least one first power source 106; and v) driving the at least one slew bearing 110 by at least one second power source 112 mounted to the at least one gimbal frame 108 to change the orientation of the at least one gyroscopic rotor 102.

It will be appreciated that the methods according to the present invention include further steps corresponding to operating the specific embodiments described herein.

It will be appreciated that embodiments of the gyroscopic modules according to the present invention are fully compatible with the Applicant's improved load management systems and methods as described in International patent application no. PCT/AU2016/050941. The modular nature of the gyroscopic modules 100-100H according to the present invention has been maintained and a greater number of the gyroscopic modules according to the present invention can be combined in the same volume as the gyroscopic modules disclosed in PCT/AU2016/050941. Therefore, the gyroscopic modules according to the present invention provide a greater output per unit volume and provide greater versatility in terms of the combinations available to suit particular performance requirements.

Hence, embodiments of the present invention address or at least ameliorate at least some of the aforementioned problems. For example, the distributed nature of the rolling elements and rolling element races in the one or more slew bearings 110 enables the load, in this case the one or more gyroscopic rotors 102, to be supported and controlled within an envelope effectively no bigger than the swept volume of the gyroscopic rotors 102. The particular arrangements of the embodiments described herein and illustrated in the accompanying drawings enable a complete gyroscopic module 100, including rotors 102, drive motors 106, 112, bearings, gimbals, electrical wiring, any sensors, input or output devices and, if necessary, batteries, to be housed inside a cylinder with both the internal length and diameter equal to the outside diameter of the gyroscopic rotor itself, so the design requirement is satisfied. In addition to a reduction in volume rendering the present invention suitable for a broader range of applications, the reduction in mass, complexity and cost of production and operation and improved durability compared with at least some of the prior art provide additional advantages.

In this specification, the terms "comprises", "comprising" or similar terms are intended to mean a non-exclusive inclusion, such that an apparatus that comprises a list of elements does not include those elements solely, but may well include other elements not listed.

Throughout the specification the aim has been to describe the invention without limiting the invention to any one embodiment or specific collection of features. Persons skilled in the relevant art may realize variations from the specific embodiments that will nonetheless fall within the scope of the invention. For example, it is envisaged that one or more features from two or more embodiments described herein can be combined to form one or more further embodiments.

The invention claimed is:

1. A gyroscopic module comprising:
at least one gyroscopic rotor rotatably mounted to a support, the at least one gyroscopic rotor driven by at least one first power source;
at least one gimbal frame coupled to the support of the at least one gyroscopic rotor; and
at least one slew bearing coupled to the at least one gimbal frame to change an orientation of the at least one gyroscopic rotor, the at least one slew bearing driven by at least one second power source mounted to the at least one gimbal frame;
wherein the at least one slew bearing comprises a fixed inner ring comprising a ring gear and an outer ring movable relative to the inner ring.

2. The gyroscopic module of claim 1, wherein the at least one gyroscopic rotor consists of one gyroscopic rotor;
wherein the at least one first power source consists of one first power source;
wherein the at least one gimbal frame comprises two gimbal frames, each coupled to an opposite side of the support of the one gyroscopic rotor; and
wherein the at least one slew bearing comprises two slew bearings, each coupled to one respective gimbal frame, wherein each slew bearing is driven by one respective second power source of the at least one second power source.

3. The gyroscopic module of claim 1, wherein the at least one gyroscopic rotor consists of one gyroscopic rotor;
wherein the at least one first power source consists of one first power source;
wherein the at least one gimbal frame comprises two gimbal frames, each coupled to an opposite side of the support of the one gyroscopic rotor; and
wherein the at least one slew bearing comprises two slew bearings, each coupled to one respective gimbal frame, wherein one of the slew bearings is driven by one respective second power source of the at least one second power source.

4. The gyroscopic module of claim 1, wherein the at least one gyroscopic rotor consists of one gyroscopic rotor;
wherein the at least one first power source consists of one first power source;
wherein the at least one gimbal frame comprises two gimbal frames, each coupled to one side of the support of the one gyroscopic rotor; and
wherein the at least one slew bearing comprises one slew bearing coupled to the two gimbal frames, the one slew bearing driven by one second power source of the at least one second power source.

5. The gyroscopic module of claim 1, wherein the at least one gyroscopic rotor comprises two gyroscopic rotors, each driven by one respective first power source of the at least one first power source;
wherein the at least one gimbal frame comprises two pairs of gimbal frames, each pair of gimbal frames coupled to an opposite side of the support; and
wherein the at least one slew bearing comprises one slew bearing coupled to each of the gimbal frames and between the two gyroscopic rotors to change the orientation of the two gyroscopic rotors simultaneously, the one slew bearing driven by one second power source of the at least one second power source.

6. The gyroscopic module of claim 1, wherein the
at least one gyroscopic rotor comprises two gyroscopic rotors driven by one first power source of the at least one first power source;
wherein the at least one gimbal frame comprises two gimbal frames, each coupled to an opposite side of the support of at least one of the two gyroscopic rotors; and
wherein the at least one slew bearing comprises one slew bearing coupled to each of the gimbal frames and between the two gyroscopic rotors to change the orientation of the two gyroscopic rotors, the one slew bearing driven by one second power source of the at least one second power source.

7. The gyroscopic module of claim 6, further comprising: a belt or an endless loop coupled between the two gyroscopic rotors such that a first one of the two gyroscopic rotors is driven by the one first power source and a second one of the two gyroscopic rotors is driven by the belt or the endless loop.

8. The gyroscopic module of claim 7, wherein at least one of the gimbal frames comprises an aperture allowing passage therethrough of the belt, or the endless loop coupled between the two gyroscopic rotors.

9. The gyroscopic module of claim 1, wherein the at least one first power source and/or the at least one second power source is in the form of an electric motor.

10. The gyroscopic module of claim 1, wherein the outer ring of the at least one slew bearing is coupled to the at least one gimbal frame.

11. The gyroscopic module of claim 1, wherein the ring gear is offset towards the at least one gyroscopic rotor.

12. The gyroscopic module of claim 1, wherein a pinion gear is coupled to the at least one second power source and is in engagement with the ring gear of the inner ring such that rotation of the pinion gear causes rotational movement of the outer ring of the at least one slew bearing relative to the inner ring to change the orientation of the at least one gyroscopic rotor.

13. The gyroscopic module of claim 12, wherein the at least one second power source is mounted on one side of the at least one gimbal frame and the pinion gear is mounted on the other side of the at least one gimbal frame to a drive shaft of the at least one second power source extending through an aperture in the at least one gimbal frame.

14. The gyroscopic module of claim 1, wherein the at least one gyroscopic rotor is eccentric in that the support of the at least one gyroscopic rotor is offset transverse to an axis of a drive shaft of the at least one first power source.

15. The gyroscopic module of claim 1, wherein the at least one first power source is a wheel or hub style motor, wherein the at least one gyroscopic rotor is an integral part of the construction of the motor.

16. The gyroscopic module of claim 1, wherein the at least one gyroscopic rotor rotates within a vacuum.

17. The gyroscopic module of claim 16, wherein the vacuum is contained within a stationary, hollow vacuum cover fixed to the support;

wherein the hollow vacuum cover is symmetrical and/or has a cross-sectional shape conforming to the cross-sectional shape of the at least one gyroscopic rotor; or wherein the hollow vacuum cover has a different cross-sectional shape to the cross-sectional shape of the at least one gyroscopic rotor so that at least part of the vacuum cover forms structural support for one or more components of the gyroscopic module; and further comprising a vacuum pump mounted to the support and a conduit coupled between the vacuum pump and an interior of the hollow vacuum cover; and further comprising one or more seals within the hollow vacuum cover against a shaft of the at least one first power source.

18. A method of changing an orientation of at least one gyroscopic rotor in a gyroscopic module, the method comprising:

rotatably mounting the at least one gyroscopic rotor to a support;

coupling at least one gimbal frame to the support of the at least one gyroscopic rotor;

coupling at least one slew bearing to the at least one gimbal frame, wherein the at least one slew bearing comprises a fixed inner ring comprising a ring gear and an outer ring movable relative to the inner ring;

driving the at least one gyroscopic rotor by at least one first power source; and driving the at least one slew bearing by at least one second power source mounted to the at least one gimbal frame to change the orientation of the at least one gyroscopic rotor.

19. A method of changing an orientation of at least one gyroscopic rotor in a gyroscopic module, the method comprising:

the at least one gyroscopic rotor rotatably mounted to a support;

at least one first power source coupled to the at least one gyroscopic rotor;

at least one gimbal frame coupled to the support of the at least one gyroscopic rotor;

at least one slew bearing coupled to the at least one gimbal frame; wherein the at least one slew bearing comprises a fixed inner ring comprising a ring gear and an outer ring movable relative to the inner ring; and at least one second power source mounted to the at least one gimbal frame, the method comprising driving the at least one slew bearing with the at least one second power source to change the orientation of the at least one gyroscopic rotor.

\* \* \* \* \*